(12) United States Patent
Colligan et al.

(10) Patent No.: US 12,442,059 B2
(45) Date of Patent: Oct. 14, 2025

(54) ADVANCED SYSTEMS AND METHODS FOR LEACHING RARE EARTHS FROM ORE

(71) Applicant: COLORADO SCHOOL OF MINES, Golden, CO (US)

(72) Inventors: Grant T. Colligan, Golden, CO (US); Corby G. Anderson, Golden, CO (US); Brock O'Kelley, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 17/575,357

(22) Filed: Jan. 13, 2022

(65) Prior Publication Data

US 2022/0228237 A1 Jul. 21, 2022

Related U.S. Application Data

(60) Provisional application No. 63/138,112, filed on Jan. 15, 2021.

(51) Int. Cl.
*C22B 59/00* (2006.01)
*C22B 3/10* (2006.01)

(52) U.S. Cl.
CPC ............... *C22B 59/00* (2013.01); *C22B 3/10* (2013.01)

(58) Field of Classification Search
CPC . C22B 59/00; C22B 3/10; C22B 26/10; Y02P 10/20
USPC .......................................................... 75/743
See application file for complete search history.

(56) References Cited

U.S. PATENT DOCUMENTS

2020/0308670 A1 * 10/2020 Daware ................... C22B 7/007

FOREIGN PATENT DOCUMENTS

| CN | 109266839 A | * | 4/2020 | ............... C22B 1/02 |
| WO | WO-2013152423 A1 | * | 10/2013 | ............... C22B 3/08 |
| WO | WO-2020233826 A1 | * | 11/2020 | ........... C22B 3/0025 |

OTHER PUBLICATIONS

CN-109266839-B Translation (Year: 2020).*
Zheng Ruan, Effect of Particle Size Refinement on the Leaching Behavior of Mixed Rare-Earth Concentrate Using Hydrochloric Acid, ACS Omega 2019, 4, 9813-9822 (Year: 2019).*
Basic Mining and Processing Principles, Nevada Division of Environmental Protection (Year: 2024).*

(Continued)

*Primary Examiner* — Brian D Walck
*Assistant Examiner* — Danielle Carda
(74) *Attorney, Agent, or Firm* — Dorsey & Whitney LLP

(57) ABSTRACT

With the world's rapid advancement of technology, the demand and need for the materials that make up that technology has exploded. An important group of materials needed in this rapid advancement are the rare earth elements (REE) used in countless necessary applications. One source of rare earths found in the United States is bastnaesite, a rare earth bearing fluorocarbonate, mined at the Mountain Pass Mine in California. To increase production, it has been essential to optimize existing processes and create new ones to exploit current reserves. This research program was run to expand the understanding of the bastnaesite leaching system. A novel single stage hydrochloric leach system was created to optimize the rare earth extraction from bastnaesite. Typically, this process has utilized a two-stage leach system involving a high temperature hydrochloric acid leach followed by a caustic crack.

20 Claims, 14 Drawing Sheets

(56) References Cited

OTHER PUBLICATIONS

Britannica, Minerals and Ores, 2024 (Year: 2024).*
Fuerstenau, D.W., et al., "Design and development of novel flotation reagents for the beneficiation of Mountain Pass rare-earth ore", Minerals & Metallurgical Processing; vol. 30 No. 1, Feb. 2013, pp. 1-9.
Gupta, C.K., et al., "Extractive Metallurgy of Rare Earths", CRC Press, 2005, pp. 1-462.

* cited by examiner

ADVANCED SYSTEMS AND METHODS FOR LEACHING RARE EARTHS FROM ORE

CROSS-REFERENCE TO RELATED APPLICATIONS

This application claims benefit of priority pursuant to 35 U.S.C. § 119(e) of U.S. provisional patent application No. 63/138,112 entitled "ADVANCED SYSTEMS AND METHODS FOR LEACHING RARE EARTHS FROM ORE," filed on Jan. 15, 2021, which is hereby incorporated by reference in its entirety.

FIELD

The disclosed processes, methods, and systems are useful in extracting and recovering rare earths from ore, for example bastnaesite.

BACKGROUND

The demand for rare earth elements (REE) continues to expand. However, current processes are inefficient losing material to waste and consuming other chemicals in the process. Moreover existing processes are relatively high cost—both economically and environmentally.

One major product from the processing of ore for rare earths is bastnaesite. Bastnaesite is a rare earth fluorocarbonate often used to liberate the rare earth from concentrates by breaking chemical bonds holding the material together, this allows the material to dissolve into an aqueous form. Typically, this process is performed through a two-stage hydrochloric acid leach, caustic crack process. The leach portion of this process tends to be inefficient, producing a solid residue for subsequent cracking with only around 55% to 60% recovery of rare earths. This is well below the theoretical limit of 70%.

What is needed is a process with increased efficiency, that reduces the processing costs and limits the amount of reagents needed.

SUMMARY

In one aspect, a method is disclosed wherein at least one rare earth element may be leached from an ore material, the method comprising: (a) combining the ore material and an acid-containing liquid to form a solution, wherein the solution has a normality between about 1N and 5N; (b) heating the solution up to between about 60 degrees Celsius and 100 degrees Celsius; (c) allowing the at least one rare earth element in the ore material to dissolve and leach out of the ore to create a liquor comprising the at least one rare earth element, wherein the at least one rare earth element may be selected from cerium, lanthanum, praseodymium and neodymium, and/or the ore may comprise at least one mineral selected from monazite, xenotime, allanite, cerite, euxenite, fergusonite, bastnaesite, and gadolinite. In some embodiments, the mineral may be bastnaesite and the at least one rare earth element may be cesium and/or lanthanum. In many embodiments, the acid may be hydrochloric acid, and the solution may have a normality between about 3N and about 6N, for example about 4 to 6N, or about 4N. The solution may comprise solids at a concentration of between about 5 g/L and about 20 g/L, for example between about 10 g/L and about 20 g/L, or about 15 g/L, or about 20 g/L. 12. In some embodiments, the ore may be ground to a size of between about 12 µm and about 0.5 µm, for example, about 80% of the ore may pass through 400 mesh. The method may further comprise (d), after (c), wherein the liquor is separated from solids in the solution, and greater than about 80% of the at least one rare earth element may be in the liquor, and/or the method may comprise (b'), after (a), wherein the solution may be agitate, or (b) may include agitating the solution.

In another aspect, a method of leaching cesium from a bastnaesite containing ore is disclosed, the method comprising: (a) combining the ore material and a liquid comprising HCl at a ratio of about 15-20 g ore per liter of liquid, to form a solution, wherein the solution has a normality of at least 3N; (b) heating the solution up to at least 85 degrees Celsius and agitating the solution; (c) allowing the cesium in the ore material to dissolve and leach out of the ore to create a cesium liquor, and, optionally, (d) of separating the liquor from the solids in the solution, and/or about 80% of the cesium from the ore may be in the liquor.

DETAILED DESCRIPTION

Figure 1:
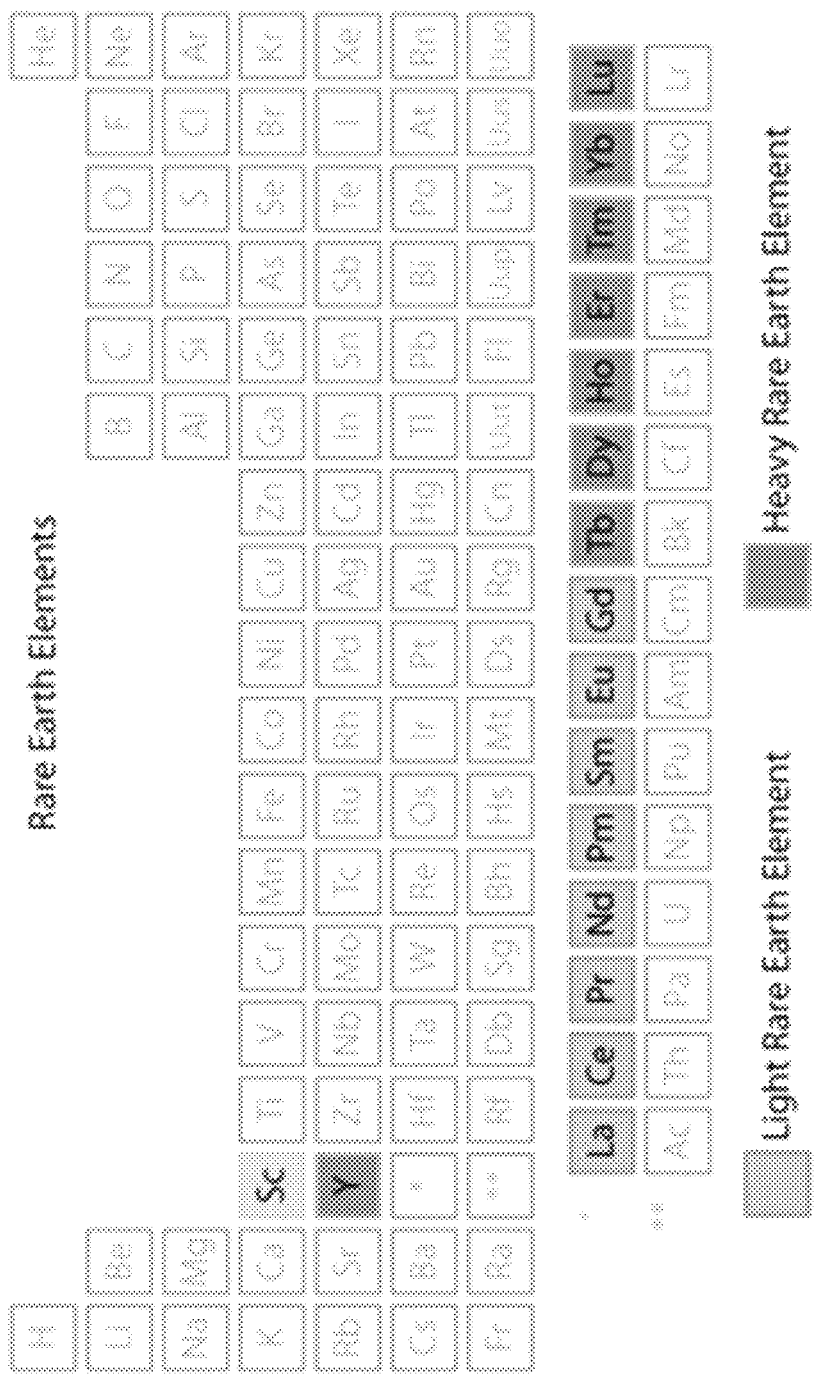
FIG. 1: Rare earth elements periodic table locations.

Disclosed herein are novel, effective, and efficient methods and systems for the recovery of rare earth elements from an ore. The presently described method provides for surprisingly enhanced recovery of the rare earth elements, with fewer resources and steps. Applicants have found that, in contrast to existing processes, the enhanced extraction and recovery of rare earth elements could be achieved using a single leach. This is surprising because historically, extraction required a two stage leach and crack system and only resulted in 70% maximum recovery, while the present process results in around 95% or more recovery of the rare earth elements from the ore.

Disclosed herein are methods and systems for recovering rare earth elements from various ores. Disclosed ores may include one or more of monazite, xenotime, allanite, cerite, euxenite, fergusonite, bastnaesite, and gadolinite. In many embodiments the ore is bastnaesite. In many embodiments, the rare earth may be one or more of scandium, yttrium, cerium, and the elements within the lanthanide series, for example, cerium, lanthanum, neodymium, paraseodymium. In many embodiments the ore is ground to a p80 of less than about 45 micron.

With the need to expand the production of rare earth elements (REE) to meet ever-expanding demand, it becomes necessary to have a production process that produces these materials in the best possible way. This process needs to be efficient as possible by not losing material to waste, limiting the amount of chemicals needed in the process, limiting its environmental impact, and having a relatively low cost allowing for commercial production. One major part of this process for rare earths is the leaching of bastnaesite, a rare earth fluorocarbonate, used to liberate the rare earths from concentrates by breaking the chemical bonds that hold the bastnaesite material together, allowing the material to dissolve into an aqueous form. The modern version of this process has been performed through a two-stage hydrochloric acid leach, caustic crack process at the Mountain Pass Mine in California. The leach portion of this process has been inefficient producing a solid residue to be sent to cracking with only around 55% to 60% recovery of rare earths. This is well below the theoretical limit of 70%. It is thought that fluorides play an important role in limiting REE dissolution. The inefficiency of this process along with a push to reduce the cost and limit the amount of reagents needed to perform this leach lead to this investigation.

Spurred on by prior knowledge of the leach system the advisers of this research steered the beginning of this work to focus on how ultra-fine grinding the feed material to the leach would alter the kinetics of the leach and lead to recoveries that are closer to the theoretical limit of 70%. Using this as a starting point, a research plan was developed to see how changing the kinetics of the leach system would affect the rare earth recovery. Focusing on this, thermodynamic calculations were performed to understand the thermodynamic driving forces to perform the processes needed to dissolve the REEs. Following this, a series of leaching experiments were performed to analyze the impacts of major parameters on rare earth recovery. These surprising results that implicate the leaching process can be performed in a single stage leach, not the historic two stage leach and crack system. Using the results of the leaching tests, a single stage leach process is proposed and economic cashflow models were developed to analyze the economic differences between the two-stage historic leach crack circuit against the proposed single stage leach circuit.

The description that follows includes sample systems, methods, and apparatuses that embody various elements of the present disclosure. However, it should be understood that the described disclosure may be practiced in a variety of forms in addition to those described herein.

Background—Rare Earths

Rare earth elements (REE) are a series of elements that share chemical characteristics. These elements include scandium, yttrium and the elements within the lanthanide series. The FIG. 1 shows the rare earth elements on the periodic table. All the elements were discovered between 1788 and 1941. Almost all these elements occur in non-pure form so in production, all the elements need to be separated from waste material and then purified to forms that can be used. Industry scale production began in the 1960's and lead to further evaluation of the element's properties. FIG. 1 shows rare earth elements on periodic table.

Rare earth elements are necessary in a wide range of industries. Early in rare earth production the major uses of these elements were in the production of high-strength steels, lubricants, and other specialized metallurgical uses. With the boom of the electronic industries the major users of these elements now are in specialized electronic components, high strength magnets, high performance batteries, and other highly specialized uses. The uses of rare earths will continue to grow and expand as the expansion of green technologies will continue to need rare earths to create new technologies and expand current capabilities. Table 1 shows the rare earths and their uses.

Rare Earth Deposits

Rare earth elements are a misnomer in the fact that the rare earth containing material is not all that rare, the material can be found around the world, just not in many economic deposits. A majority of the time rare earth containing minerals occur alongside other more economic minerals, such as Iron ore. The mineral reserve sizes of major deposit containing countries are shown in Table 2.

Major world production of REEs focuses around the rare earth containing minerals bastnaesite, monazite and xenotime. There are other rare earth containing minerals but these three are the major economic minerals. Beginning in 1949 with the Mountain Pass mine in California, bastnaesite has been the major source of rare earths. Bastnaesite is a rare earth containing fluorocarbonate being primarily composed of cerium and lanthanum. Mountain pass was the major producer of rare earths from bastnaesite until the late 1990's when the Bayan Obo Iron ore mine in China expanded capabilities to capture rare earths as a secondary product, making it the largest producer of rare earth elements. The gangue materials commonly found with bastnaesite ore bodies are calcite, barite, dolomite, and silicate minerals.

Rare Earth Market

The rare earth market is currently dominated by China who controlled about 86% of the world's production of rare earth elements in 2017. Before the expansion of the Bayan Obo Iron mine in China, the market was controlled by the Mountain Pass mine located in southern California. Mountain Pass was operating from the 1950's until 2015 when the controlling company filed bankruptcy. During that time period the Mountain Pass Mine was the sole producer of US sourced rare earth materials in the United States. Since the closing of the Mountain Pass mine the United States has been reliant on foreign production of rare earths for all uses. The United States needs to expand production capacity in order to relinquish the dependence on foreign production of rare earths.

TABLE 1

List of rare earth elements and major uses

| Z | ELEMENT | SYMBOL | USE |
|---|---------|--------|-----|
| 21 | Scandium | Sc | Aerospace framework, high intensity street lamps, high performance equipment |
| 39 | Yttrium | Y | TV sets, cancer treatment drugs, enhances strength of alloys |
| 57 | Lanthanum | La | Camera lenses, battery-electrodes, hydrogen storage |
| 58 | Cerium | Ce | Catalytic converters, colored glass, steel production |
| 59 | Praseodymium | Pr | Super-strong magnets, welding goggles, lasers |
| 60 | Neodymium | Nd | Extremely strong permanent magnets, microphones, electric motors of hybrid automobiles, laser |
| 61 | Promethium | Pm | Not usually found in Nature |
| 62 | Samarium | Sm | Cancer treatment, nuclear reactor control rods, X-ray lasers |
| 63 | Europium | Eu | Color TV screens, fluorescent glass, genetic screening tests |
| 64 | Gadolinium | Gd | Shielding in nuclear reactors, nuclear marine propulsion, increases durability of alloys |
| 65 | Terbium | Tb | TV sets, fuel cells, sonar systems |
| 66 | Dysprosium | Dy | Commercial lighting, hard disk devices, transducers |
| 67 | Holmium | Ho | Lasers, glass coloring, High-strength magnets |
| 68 | Erbium | Er | Glass colorant, signal amplification for fiber optic cables, metallurgical uses |
| 69 | Thulium | Tm | High efficiency lasers, portable x-ray machines, high temperature superconductor |
| 70 | Ytterbium | Yb | Improves stainless steel, lasers, ground monitoring devices |
| 71 | Lutetium | Lu | Refining petroleum, LED light bulbs, integrated circuit manufacturing |

TABLE 2

Reserves of major rare earth producing countries in 2014. Reserves (Data in metric tonnes of rare earth oxide (REO) content unless otherwise noted)

| | |
|---|---|
| United States | 13,000,000 |
| Australia | 2,100,000 |
| Brazil | 22,000,000 |
| China | 55,000,000 |
| India | 3,100,000 |
| Malaysia | 30,000 |
| Russia | (?) |
| Vietnam | (?) |
| Other countries | 41,000,000 |
| World total (rounded) | 140,000,000 |

The price of rare earths depend largely on the purity and state of the metal, along with its relative amount in use compared to production. Pure rare earth metals have a higher selling price than metal oxides though rare earths are used as both metals and metal oxide in industry. The price of rare earths largely depend on the abundance of the individual metal on the world market place, this then in turn means that China has a large amount of control over the price of rare earths. In 2010 China put an export quota on rare earths, creating a large jump in the price of rare earths across the world. After a short amount of time the quota was removed and the prices of most rare earths fell to close to pre-quota levels. Table 3 shows the price of rare earths after the export quota.

TABLE 3

REE metal Prices in 2015.

| Rare Earth Metal | Price (USD)/kg |
|---|---|
| Lanthanum (>99%) | $7.00 |
| Cerium (>99%) | $7.00 |
| Praseodymium (>99%) | $85.00 |
| Neodymium (>99.5%) | $60.00 |
| Samarium (>99.9%) | $7.00 |
| Gadolinium (>99.9%) | $55.00 |
| Terbium (>99.5%) | $550.00 |
| Dysprosium (>99%) | $350.00 |
| Erbium (>99.9%) | $95.00 |
| Yttrium (>99.9%) | $35.00 |

Rare Earth Mineral Processing

Rare earths like all other minerals are processed based on the specific material contained within the deposit. The material processing differs between each operation but broadly the material must be mined, liberated, separated, extracted, and finely refined into a product that can be sold. The liberation step starts with blasting, or other direct mining activities. This is followed by crushing and grinding with the goal of grinding to a particle size that the economic material is fully liberated from the gangue material. Separation is done through physical and chemical means; this is the process of trying to separate the economic mineral away from the minerals that are not economic. Following the separation, the economic metal must be extracted from within the containing mineral Finally the extracted material goes to refining; this is the process of the removing contaminants from the extracted metal. In the case of rare earths where a few different elements occur within the same mineral, the separation between rare earths usually occurs in later extraction steps or in the refining process.

Figure 2:
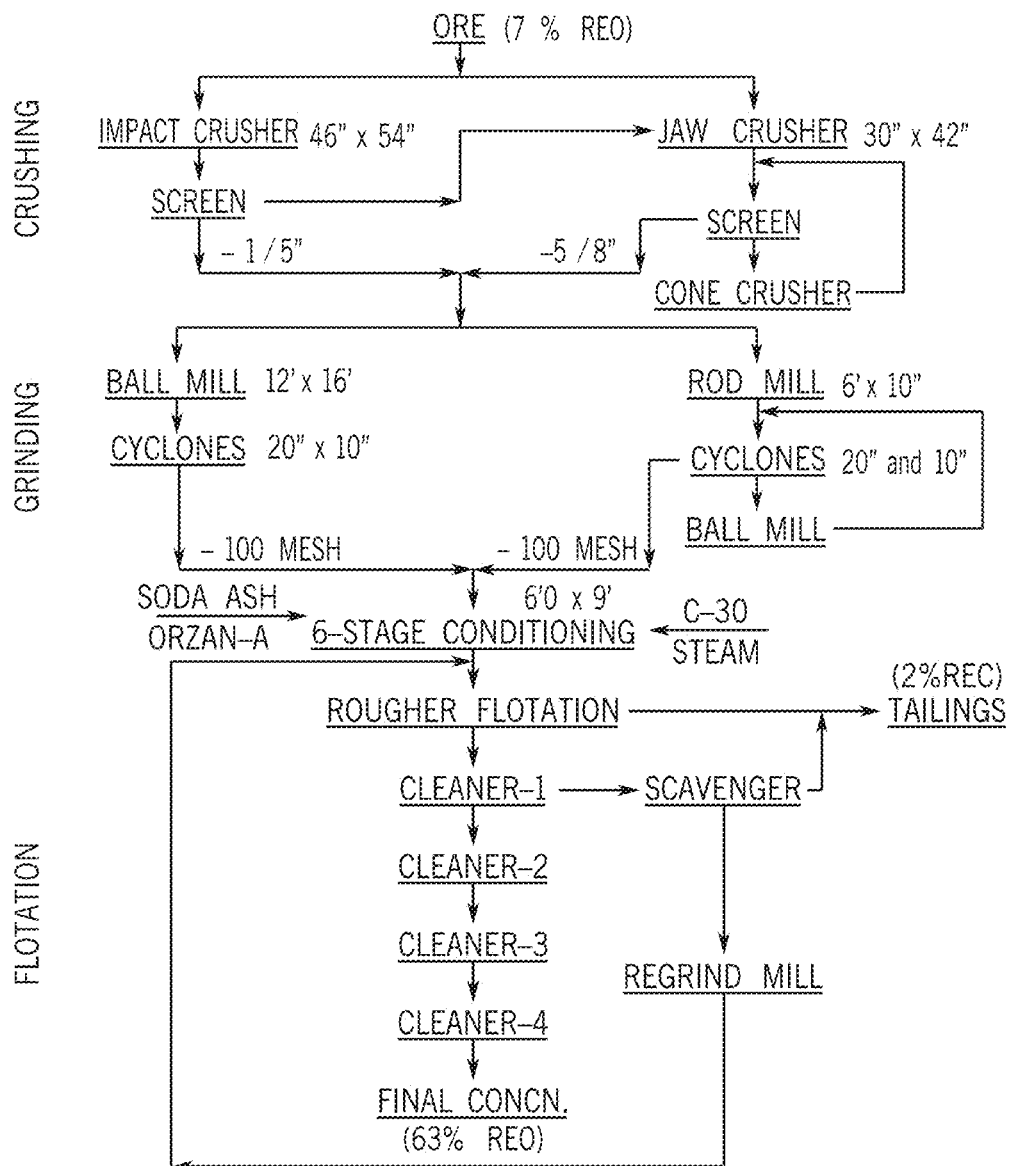
FIG. 2: Simplified Mountain Pass beneficiation flow sheet.

At Mountain Pass mine the material is mined and placed into blending piles of ore containing around 7% rare earth oxide, a value representing the amount of material that is available for extraction from waste material without chemical processing. The ore is then feed to beneficiation, where the material is crushed and ground to 100% passing 150 mesh. After grinding the ground material is fed to froth flotation. This occurs with an organic reagent to separate the bastnaesite from the major gangue minerals of calcite, barite, strontianite, and quartz. FIG. 2 below shows the simplified flow sheet released by Mountain Pass of recovery of bastnaesite at Mountain Pass. Significant research on optimizing this flotation process has been performed at Colorado School of Mines and data from these researchers was used as the flotation concentrate created in testing is the feed for the leach system. FIG. 2 is a simplified Mountain Pass beneficiation flow sheet.

Bastnaesite Chemical Processing

Following mineral processing, the concentrate is sent to extraction. In the case of bastnaesite the material from flotation concentration is a rare earth fluorocarbonate that must be decomposed to an aqueous form that can be separated to individual rare earths or groups of rare earths through ion exchange or solvent extraction. Historically there has been multiple processing routes used for this process.

Goldschmidt Process

Figure 3:
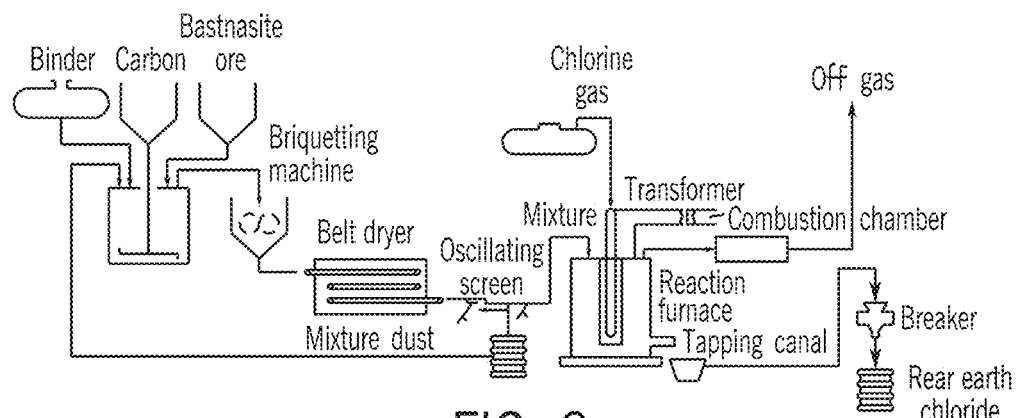
FIG. 3: Flow sheet of general Goldschmidt calcination process.

One process used to perform this extraction is the Goldschmidt process of bastnaesite chlorination. This process is used in multiple rare earth mineral extractions including monazite, xenotime, allanite, cerite, euxenite, fergusonite, bastnaesite, and gadolinite. In this process a flotation concentrates, or raw ore is mixed with a binder and carbon, then briquetted for the reaction vessel. FIG. 3 is a flow sheet of general Goldschmidt calcination process.

The briquettes are then dried and put into the reaction vessel with a bore for chlorine gas. This vessel is then heated to 1000 to 1200° C. for the reaction to chlorinate all portions of the pellets. The rare earth chlorides are then separated from the impurities as the impurities are pulled off the rare earth chlorides by the off gases. The reactions in the calcination vessel are shown below.

$$3REF(CO_3) = REF_3 + RE_2O_3 + 3CO_2 \quad (2.1)$$

$$RE_2O_3 + 3C + 3Cl_2 = 2RECl_3 + 3CO$$

This process has been tested to have rare earth recovery up to 60-70%, a trend in bastnaesite extraction, representing the highest recovery possible due to interaction of fluoride with the reacted rare earths. The cited advantages to this process are the simplicity of the flow sheet, small footprint of the reaction vessel, low labor component, and relatively low energy costs. The downsides to the process are the high volatilization of the impurities create large amounts of off gases that need to be treated before exhausted outside the plant.

Molycorp Processes

Molycorp had a series of processes that were used for the extraction of rare earths from Mountain Pass Mine flotation concentrate. The first process used was a roast-leach system. This process begins with flotation concentrate that is roasted to 620° C. to calcine the bastnaesite and oxidize the cerium. The calcine is then treated with weak HCl to dissolve non-cerium rare earths, leaving a cerium residue. This process yielded 55-60% cerium recovery while other solubilized REE were sent to further separation and purification. The cerium product produced in this process had a relatively high radiation content, which over time lead to the product losing major market share. This led to a need to change the production route of cerium to be solubilized into solution with the other rare earths to put the cerium product in a form that could be sold without the high radiation content.

Figure 4:
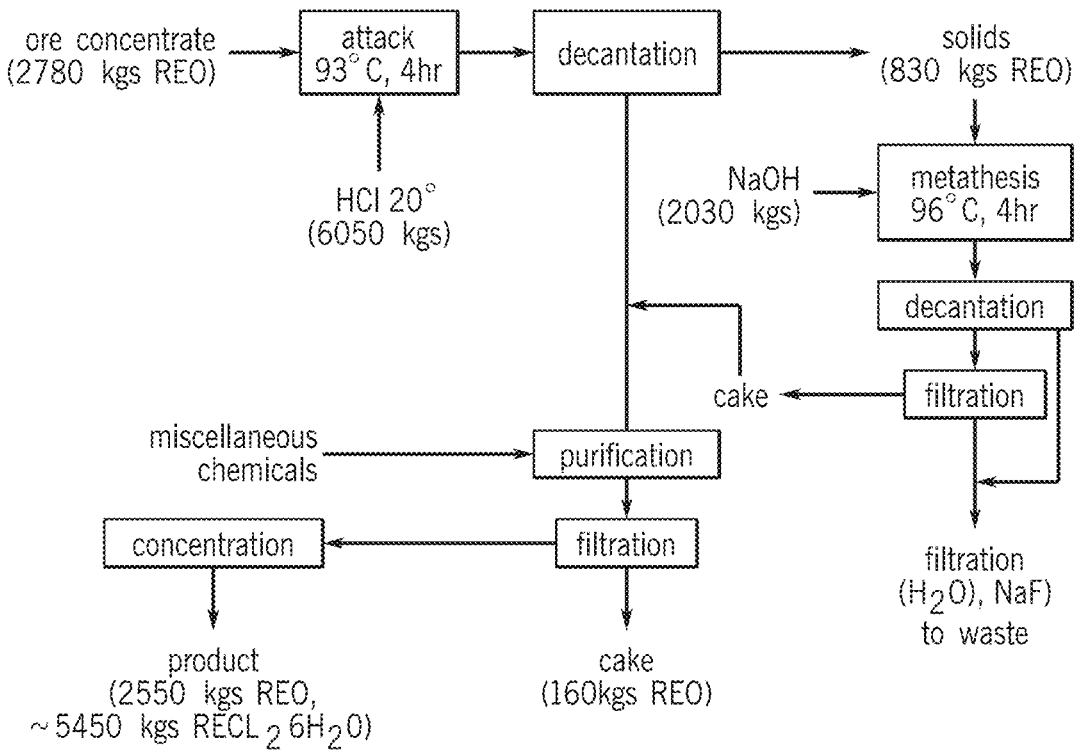
FIG. 4: Flowsheet of the Molycorp bastnaesite extraction process.

With the need to expand to production to different rare earths the Molycorp process changed to increase the recovery of the system and expand the number of rare earths recovered. This process takes place in three steps. The first step being a high normality acid leach. This process is done at 93° C., with 12 normal hydrochloric acid for 4 hours. The entire process is shown in FIG. 4.

Following the high normality leach the leach liquor is separated from the leached tails. The leached solids are sent to a caustic crack presumably to break the fluorides that hadn't reacted during the HCl leach. These leached solids are the key to the inconstancy that is seen in the leaching process, as it was unknown how the structure of the bastnaesite changes when reacting with hydrochloric acid. In the cracking leach, high concentrations of caustic are used, up to 500 kg of NaOH per 1000 kg of leach residue. This reaction is done at 96° C. for 4 hours. After cracking, the slurry is decanted then sent to filtration. The solids from filtering are sent to tails and the liquids mixed back with the hydrochloric leach liquor. FIG. 4 is a flowsheet of the Molycorp bastnaesite extraction process.

The caustic slurry is then used to neutralize the remaining leach liquor, sent to filtration and then refining. The historic theoretical chemical reactions for this process are shown below, with the structure of the bastnaesite as a combination of distinct carbonate and fluoride structures. This structure led to the thought that the two-stage leach is necessary in order to leach the two distinct structures.

$$REF_3 \cdot RE_2(CO_3)_3 + 9HCl = REF_3 + 2RECl_3 + 3HCl + 3H_2O + 3CO_2 \quad (2.2)$$

$$REF_3 + 3NaOH = RE(OH)_3 + 3NaF$$

$$RE(OH)_3 + 3HCl = RECl_3 + 3H_2O$$

Overall, the Molycorp leaching process produced a rare earth recovery up to 65-70% of rare earth chlorides that could be sent to separate rare earths from one another. The 70% maximum recovery is shown again indicating the difficulty found in the dissolution of the fluoride produced during the leaching step. Some major problems that occurred with this process is the high amounts of reagents needed to produce the recoveries. This process was used for years as the backbone of the production process at Mountain Pass. Over this time the process was slowly changed and converted to try and increase the total recovery of rare earths. These changes included changing the acid normality, the temperature, time, pressure, and slurry density, in the hopes of increasing the recovery. Around the time the mine was shut down the process was operating around a 55% to 60% recovery of rare earths from the leach. The thought for many of the changes to the system were to increase the kinetics of the leach system which was the limiting factor for the recovery.

Reaction Kinetics

Figure 5:
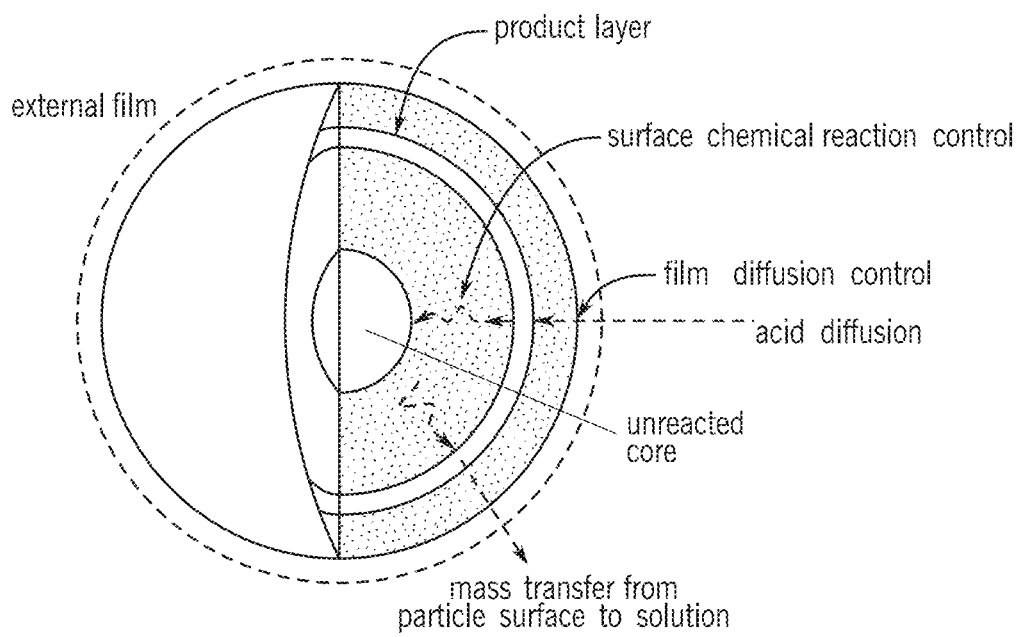
FIG. 5: Model of the shrinking core model used in leach kinetics.

Heterogeneous leaching reaction kinetics are commonly described by the shrinking core model. This model is commonly used to describe particles that are consumed during a dissolution process for processes where a product layer is thought to form during the chemical process. In the case of bastnaesite this product layer could be solid rare earth chloride that did not disassociate, or solid rare earth fluoride product. The time taken for reactions are commonly described by the slowest component of the reaction, these include film diffusion, pore diffusion, or surface reaction. Each of these models are named after the rate limited portion of the reaction. FIG. 5 shows a simple example of the shrinking core model. In the case of bastnaesite leaching the hydrochloric acid molecule would have to diffuse through the water to the surface of the bastnaesite particle, diffuse through the pores of the products of the reaction, react with the core solid bastnaesite, then the dissolved products have to diffuse out through the solid products, and finally away from the particle in solution.

The first shrinking core model is the fluid diffusion rate limited model. This reaction type occurs when the slowest part of the reaction is the diffusion of acid in the fluid. The pseudo steady state time for reaction is described by the following equation.

$$t = \frac{\rho_B R}{3k_g C_A} \quad (2.3)$$

Where t is the total time of reaction, $\rho_B$ is the density of the solid, R is radius of the particle, $k_g$ is the mass transfer coefficient of the surface reaction, and $C_A$ is the concentration of the acid in the fluid. What is most important in this scenario is that all values in the model are on the same magnitude, so all have relative control of the time to complete reaction. Though the 3 in the denominator gives extra importance to the rate constant and the concentration of the fluid. FIG. 5 shows a model of the shrinking core model used in leach kinetics.

The second shrinking core model is the pore diffusion controlled shrinking core model. This model is used when the rate limiting portion of the reaction is the diffusion of either the acid through the boundary layer to the reaction surface and/or the diffusion of the reaction products back out of the boundary layer. The total time for reaction in this scenario Is shown in the equation below.

$$t = \frac{\rho_B R^2}{6 D_e C_A} \quad (2.4)$$

Where the coefficients are the same as before except the De is the effective diffusivity of the acid through the boundary layer. The important this to note is that the radius of the particle has a squared relationship to the time to complete reaction. This is driven by the fact that the limiting factor on the reaction is the diffusion of the leach, the farther the acid must move through a boundary layer when that process is the slowest changes the total time to reaction greatly.

The final model to discuss is the surface reaction controlled shrinking core model. This occurs when the rate limiting action in the reaction is the reaction at the unreacted surface of the shrinking core. The total time for reaction in surface reaction control is shown in the equation below.

$$t = \frac{\rho_B R}{k_s C_A} \quad (2.5)$$

Where the only difference in coefficients is the ks reaction rate coefficient at the surface. The importance of the coefficients on total time in surface control are all in the same magnitude in this model.

All the common shrinking core models have varying degrees of importance of the parameters associated with total reaction time. These parameters were all associated with if not directly correlated to the physical changes made to the Mountain Pass leach system including, the reaction temperature, acid concentration and slurry density. While some of the parameters in the kinetic models cannot be easily changed in the leach, such as the density of the particles, there is one major factor that was not tested on the industrial scale. This was the size of the particles in the leach, which in the case of the pore diffusion model, has a very large impact on the kinetics of the leach system. This knowledge lead to the focus of the beginning of this study to look on how the changing of the particle size would change the rare earth recovery of leach. Also, it was hoped that this could eliminate the cracking stage of the traditional two stage leach.

Examples

Feed Material

The material used in this study was a ROM (run of mine) ore sample from Mountain Pass Mine. The material was then split in samples using the cone and quarter method to preserve homogeneity of the sample. The samples were split into around 30 kg samples and placed into buckets for further study. The ore from the buckets was then crushed using a roll crusher first to 4 mm then to 2.3 mm. The crushed samples were split using a Jones splitter and placed into charges for flotation. This work was done by Nathanael Williams. The particle size analysis of the crushed ore is shown in Table 4.

TABLE 4

Particle size analysis using sieve screens of the crushed ore.

| Microns | Weight (g) | Percent Passing |
|---|---|---|
| +2380 | 51.2 | 89.2% |
| −2380 +1410 | 141.0 | 59.5% |
| −1410 +595 | 127.9 | 32.5% |
| −595 +210 | 70.1 | 17.7% |
| −210 +150 | 17.9 | 13.9% |
| −150 | 66.0 | 0.0% |

The material was then ground using 1 kg rod mill to grind the material down to 80% passing 400 mesh. This size was chosen to optimize the flotation circuit. The material was ground with 50% water and 50% feed in the stainless-steel rod mill. A particle size analysis was done on the ground ore and shown in Table 5.

Figure 6:
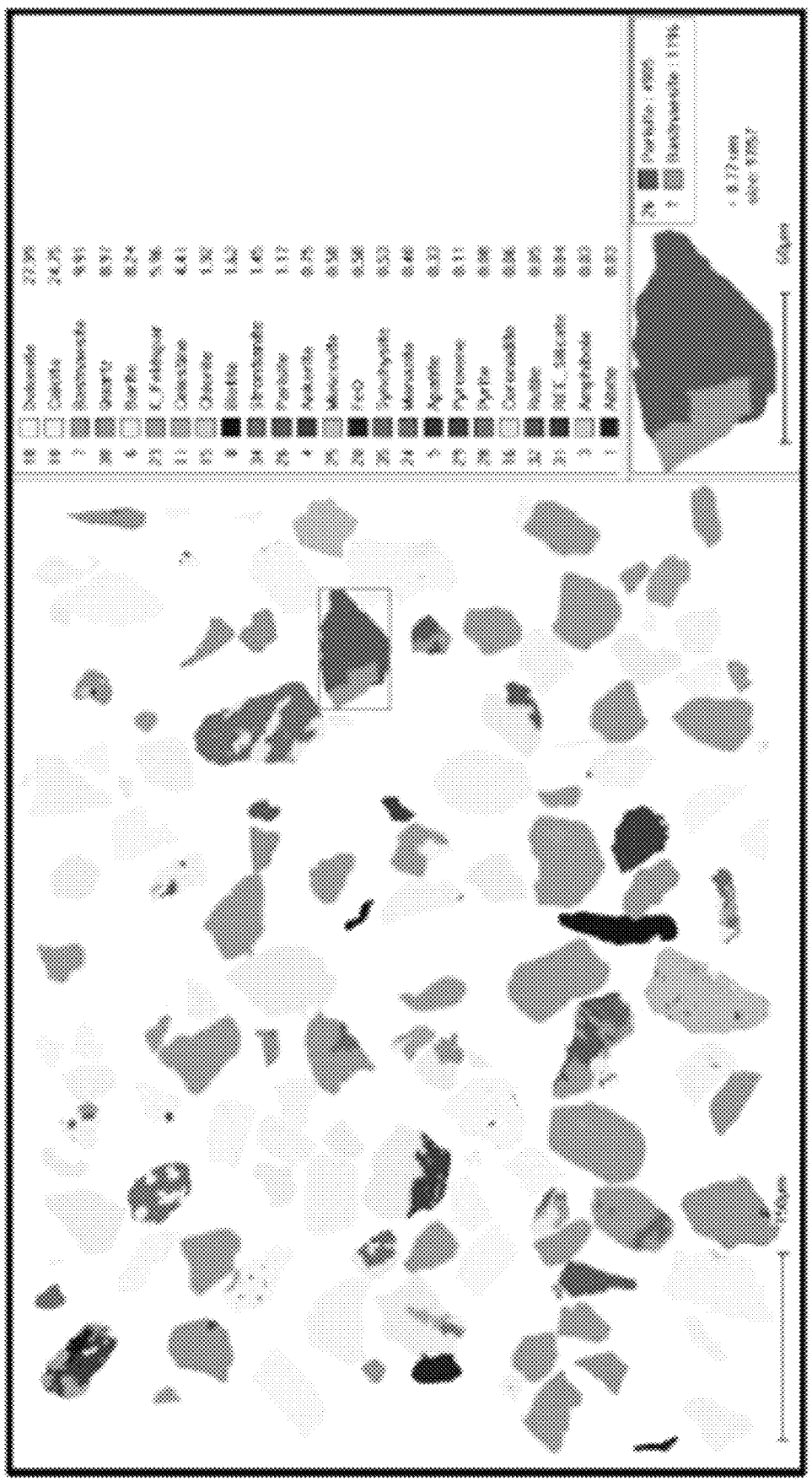
FIG. 6: MLA image of the Mountain Pass ROM ore sample.

Following the grinding of the samples the materials were sent to Montana Tech for XRD and MLA. An MLA image showing the Mountain Pass ROM material is shown in FIG. 6. The results of the MLA show that the main rare earth containing mineral is bastnaesite. The bastnaesite is also shown to be closely locked in the same size fraction as parasite, another rare earth containing mineral with similar chemistry being a rare earth calcium fluorocarbonate. FIG. 6 shows MLA image of the Mountain Pass ROM ore sample.

TABLE 5

Particle Size analysis of the ground samples.

| Microns | Weight (g) | Percent Passing |
|---|---|---|
| +150 | 0.9 | 99.9% |
| −150 +125 | 1.0 | 99.8% |
| −125 +100 | 2.2 | 99.5% |
| −100 +75 | 17.7 | 97.6% |
| −75 +53 | 76.4 | 89.1% |
| −53 +44 | 82.2 | 80.0% |
| −44 +37 | 32.2 | 76.5% |
| −37 | 410.4 | 31.0% |

Figure 7:
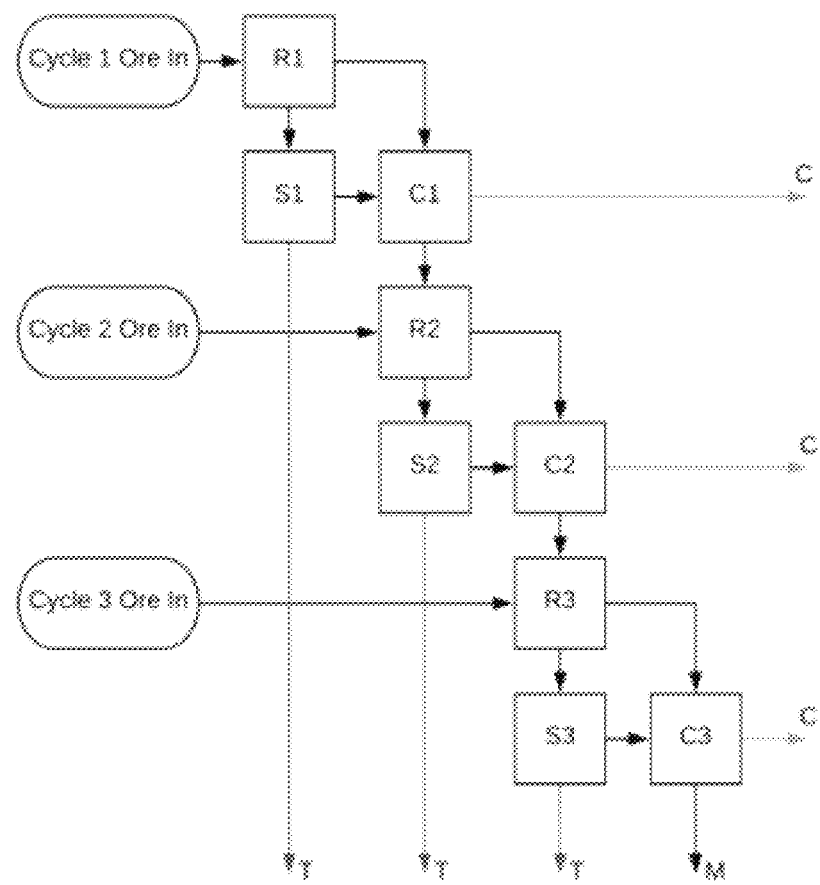
FIG. 7: Locked cycle flotation flowsheet used for sample preparation.

Following grinding, the material was concentrated using froth flotation. Flotation was done for experimentation in conjunction with Philip Keller's lock cycle flotation research. The tests were done with the commercially available collector salicylhydroxamic acid, at 82 degrees Celsius, with 3 kg of feed material prepared in 7 liters of water. Flotation was done at a pH of 8.5 using the pH modifier of soda ash. The rougher flotation was run for 5 minutes. FIG. 7 shows the flowsheet for the lock cycle flotation testing used to prepare the samples for the leaching tests performed along with Keller. FIG. 7 shows locked cycle flotation flowsheet used for sample preparation.

The locked cycle testing was used to simulate the results of a plant sized flotation circuit. After flotation the concentrate is about 30-35% rare earth elements.

Figure 8:
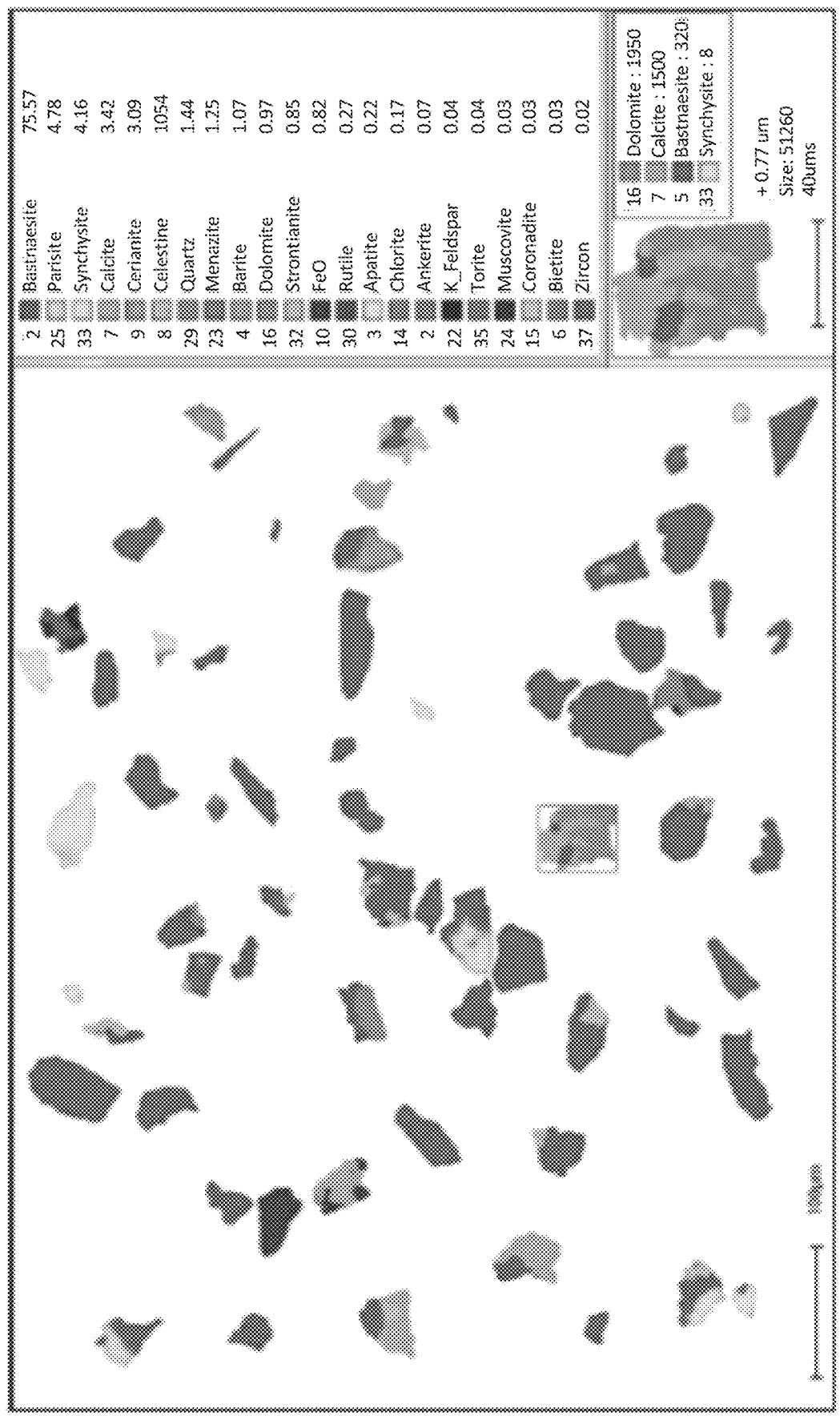
FIG. 8: MLA image of cleaner concentrate from locked cycle flotation testing.

FIG. 8 shows the minerals in the cleaner concentrate. This image shows that the material is mostly bastnaesite, with other major components being parasite, synctycite, and calcite. The bastnaesite in this material is mostly liberated.

Following flotation, the concentrate was filtered in a pressure filter, then dried. All the concentrates from the locked cycle test were then combined into one bulk sample for leach testing. This material was then tested using XRF analysis and have around 33% rare earths. The major gangue material after flotation was indicated by the noticeable amounts of barium, calcium, and iron. This is consistent with the MLA images showing that the minerals present are most likely barite, calcite, and ferrite. FIG. 8 shows MLA image of cleaner concentrate from locked cycle flotation testing.

Ultra-Fine Grinding Procedure

A large portion of the investigation into leaching optimization was the prospect of fine grinding to increase recovery in the leach. To perform this testing a fine grinding procedure was developed using an MTI MSK-SFM-1 Planetary mill.

Figure 9:
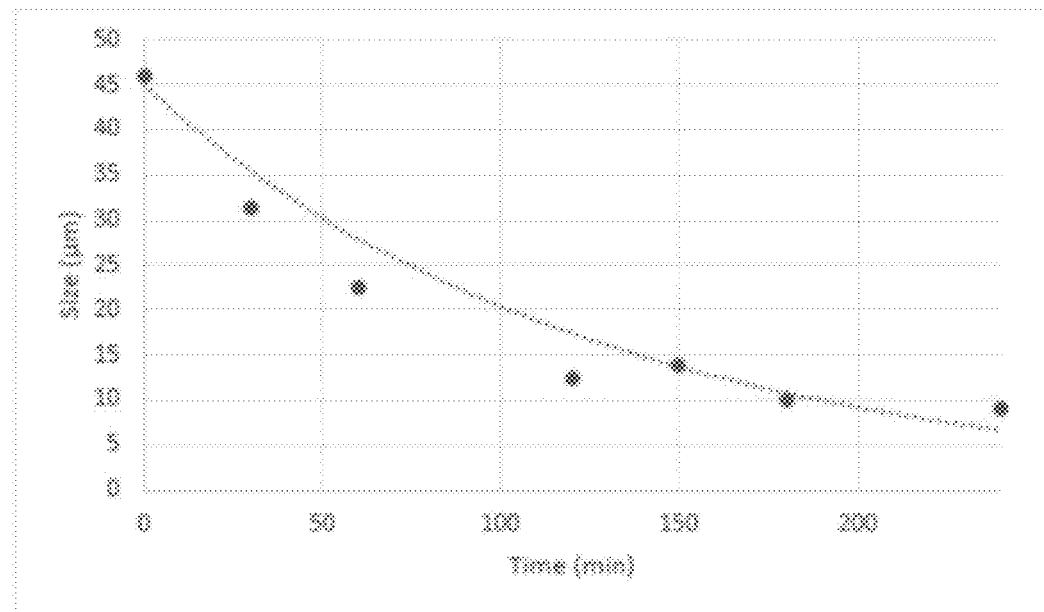
FIG. 9: p80 results of the planetary mill grinding testing.

This mill was chosen because it greatly decreased the amount of time needed to fine grind. The planetary mill holds four 100 mL grinding containers, which were filled with 40 grams of feed material along with 50 mL of water and stainless-steel spherical grinding media. The grinding media ranged in size from 10 mm to 1 mm, a range of sizes were used to allow for wide variety of final grinding sizes. The material was ground over a range of time to create a grinding curve. The results of this grinding test are shown in FIG. 9, showing the 80% passing of the different grind times.

The particle size testing was done on a Thermo-Fisher bench top laser diffraction particle size analyzer. The grinding sizes chosen for leach testing were a p80 size of 45, 25, and 5 microns. These sizes were chosen as the 5-micron size was about the smallest possible in our grinding system without creating a multi-modal size distribution, and 45-micron is the p80 size of the flotation concentrate. Then a halfway point of 25-micron would act as the center point for testing. These sizes corresponded to grinding times of 0, 75, and 240 minutes. Following ultra-fine grinding the material was run through a screen filter to separate the grinding media from the slurry, then filtered with a vacuum filter to dewater the slurry, and finally the solids were dried overnight in a drying oven. The size analysis for the sizes used in testing are shown in Appendix.

Leaching Chemistry

Historically the leaching chemistry of the Molycorp leaching process has been shown as 2.2. However, this bastnaesite chemistry has been shown to be incorrect with the results of this research. The correct chemistry for this reaction is shown in 3.1.

FIG. 9: p80 results of the planetary mill grinding testing.

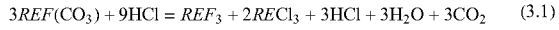

$$3REF(CO_3) + 9HCl = REF_3 + 2RECl_3 + 3HCl + 3H_2O + 3CO_2 \quad (3.1)$$

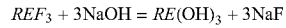

$$REF_3 + 3NaOH = RE(OH)_3 + 3NaF$$

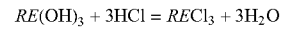

$$RE(OH)_3 + 3HCl = RECl_3 + 3H_2O$$

This original structure was simply used to show the need for multiple stages of the two-stage leach crack process. Based on knowledge gained through this research, a more accurate representation of the leaching process is shown. The reaction route would be run the same route as the outdated representation of bastnaesite, but the key difference is that the rare earth fluoride is not found directly in the bastnaesite but is produced during the leaching process. This reaction route was used in the development of a leaching system that was used for the leaching testing.

Scoping Leach Testing

To complete this investigation into rare earth leaching the first step was to obtain a testing setup that could be used for hours of leach testing. The first tests completed were to explore the amount of acid consumed by the leach in order to understand the magnitude of acid consumed during the leach. To complete this set of testing, small batch leaches were performed in a 500 mL baffled beaker, with 10 grams of flotation concentrate as feed, on a hot plate with a stir bar for mixing, and normalities of 0.1, 1, and 4 molar HCl. The leach was run for an hour with 5 mL samples of slurry taken every 15 minutes. The titration procedure of this process is shown in the appendix. The quantitative outcome of these tests is discussed later. These tests showed that the largest obstacles to performing these tests were the foaming that occurs when the acid first meets the flotation concentrate slurry, and the heat loss due to the large amount of surface area of the beaker that gives off heat.

A second set of leach scoping tests were then performed. This testing was done in the leach vessel that would become the system used for all future testing. This system is a 2 liter glass-ceramic leaching vessel with lid, over-head mixer, 120-watt temperature-controlled heating mantle, and clamps to hold the lid in place. This system is shown in the FIG. 10.

This system allowed for the slurry to be heated without large amounts of heat loss, and the ability to add acid after the slurry has been heated. This procedure allowed for control of the rate of addition of acid limiting the amount of foaming that occurs during the reaction. The scoping leach tests in this set up were done with 1 liter of acid solution, 10 grams of solid flotation concentrate feed at a p80 of 45-micron size. The tests were then run at 0.5, 1, and 4 normality HCl at both temperatures of 25° C. and 85° C. The tests were run for 1 hour at temperature then filtered using a vacuum filter and analyzed using XRF analysis.

Design of Experiments Testing Procedures

Figure 10:
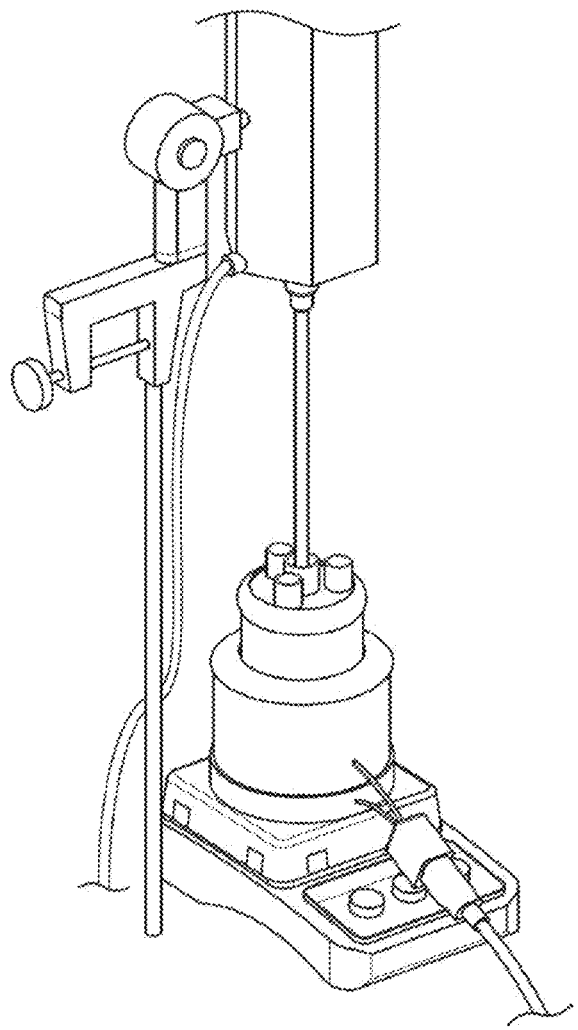
FIG. 10: Improved leaching vessel system used for leaching tests.

The bulk of the testing done is contained within three design of experiments (DOE) matrices produced using the statistical software MiniTab. A DOE matrix is used to allow for testing of multiple parameters within an experiment. This method aims to create a set of tests that can statistically show the impact of the experimental parameters on the measured result. The first DOE matrix developed for testing was created to test a series of parameters to investigate their impact of recovery of rare earths from the hydrochloric acid leach. This DOE will be called DOE1 for this research. The parameters tested in this DOE matrix are the p80 particle size of flotation concentrate solid feed, time of leach, acid normality, and calcite concentration. Calcite concentration is controlled by adding calcium carbonate, which has the same chemical composition as calcite but produced using industrial processes. The calcite concentration was thought to have an impact on the solubility of the fluoride in solution hopefully pulling the fluorine away from the rare earth to the dissolved calcium. FIG. 10: Improved leaching vessel system used for leaching tests.

TABLE 6

Parameters of DOE1.

| Parameter | Particle Size (μm) | Time (Hours) | Acid Normality | Calcite Concentration (wt %) |
|---|---|---|---|---|
| Levels | 5 | 1 | 1 | 2 |
| | 25 | 2.5 | 2.5 | 6 |
| | 45 | 4 | 4 | 10 |

These tests were performed in the leaching system developed during the leach scoping tests. The tests were run by adding 750 mL of deionized water, and flotation concentrate feed. If calcium carbonate needed to be added for the test, this was added as reagent grade powdered calcium carbonate. The slurry was then heated to the testing temperature using the heating mantle, while being mixed at 550 rpm with the overhead mixer. Once the slurry was heated, the acid was added slowly to limit the amount of foaming, mostly to keep the slurry from overflowing the leach container. The leach could run the time required by the individual test, and then pulled from the heating mantle. The leached slurry was then put directly into a vacuum filter to separate the leach tails and the leach liquor. The solids were then dried and prepped for XRF analysis. The leach liquor was saved in 50 mL vials to be prepped for ICP-MS testing. Some of the leach liquor was also sent to Hazan Laboratories for fluoride ion selective probe analysis. Following this testing the results were statistically evaluated using MiniTab.

The second DOE matrix was then developed after analyzing the results of DOE1 and was used to further investigate the leach interactions. This matrix will be denoted as DOE2. The focus of this matrix was to look at interaction between rare earth recovery and the slurry density of the leach. The thought behind this DOE was to look at the scale up of the leach testing as the 15 grams per liter of leach slurry is relatively low on an industrial scale. Feed mass is used instead of slurry density as the volume of the slurry would change with the different volumes of the feed, changing the slurry density.

TABLE 7

Parameters used for DOE2 particle size is denoted as p80.

| Parameter | Feed Mass (g) | Particle Size (μm) |
|---|---|---|
| Levels | 15 | 5 |
| | 50 | 25 |
| | 100 | 45 |
| | 200 | |

DOE2 tests were conducted in the same manner as DOE1 with the sole difference between the tests being the addition of increasing amounts of flotation concentrate feed. The major difference that occurred in these testing was the time taken to add the HCl acid to the leach container. The increased amount of solids made the reaction foam a lot more than the tests with only 15 grams of solid used. During the high feed mass test, the acid would be added over a 2 to 5 minute period to limit the amount of foaming happening in the leach container and to keep the foam from escaping the leach container through the top openings. All of the DOE2 tests were conducted at 85° C.

There was a third and final DOE created with the thought of investigating the interaction between the addition of silica and the leach recovery. This matrix was denoted as DOE3. These tests were conducted to try and better understand if the addition of silica sand would be able to react with the fluoride ions solubilized during the leaching process thereby removing fluoride from solution. The parameters used for conducting this investigation is outlined in the Table 8.

This set of testing was conducted like the first two sets of tests, using the exact same equipment and procedures. The tests with higher feed masses were again given a longer time to add the acid to the leach container to limit the amount of foaming. The silica used was reagent grade silica ground to 50-micron size. The silica was added with the other solids before heating the slurry to the 85° C. used in all these tests.

TABLE 8

Parameters used for DOE3.

| Parameter | Feed Mass (g) | Acid Normality | Silica Mass added (g) |
|---|---|---|---|
| Levels | 15 | 1 | 0 |
| | 57.5 | 4 | 2.8 |
| | 100 | | 4.5 |

XRF Analysis

X-Ray Fluorescence (XRF) is to determine the relative composition of solid samples. All testing was analyzed with XRF so all results of the tests could be compared against each other. Samples for this method were prepared with fused disks created using a Katanax X-300 fluxer.

The solid samples were prepared using a lithium borate flux with a 66.67% $Li_2B_4O_7$, 32.83% $LiBO_2$, and 0.5% LiBr. This flux is used solely to dissolve the solid samples in a material that is not detectable by the XRF. The fusion discs were prepared using 2% solid sample and 98% lithium borate flux. The mixture is heated to 1200° C., mixed, poured into a mold, then cooled. If the disc were to crack in cooling, the disc would be remade in order to keep any contaminates from making its way into the XRF.

ICP-MS Analysis

When available, induced coupled plasma mass spectrometry (ICP-MS) was used for quantitative analysis. This method of analysis is used for precise elemental quantitative measurements of liquid samples. ICP-MS can detect elemental concentrations from 200 part per million (ppm) to 10 parts per billion (ppb). To prepare samples for ICP the samples must be diluted to below 200 ppm in 2% nitric acid.

All samples must be completely dissolved in order to be run in the ICP. For the leach liquors to be tested they were simply diluted to around 10 ppm dissolved solids. This concentration was chosen to limit any damage to the machine if there was any error in the dilution procedure. The dilution was done simply using accurate laboratory pipettes, the results of the ICP analysis was then used to calculate the actual concentration of the leach liquor. An ICP-MS was used for elemental analysis.

To test solid samples in the ICP the samples must be dissolved. In the case of bastnaesite, this is relatively difficult. To perform this dissolution the samples were first fused in the lithium borate flux used in the Katanax Fluxer XRF disc procedure. The samples were dissolved at 10 mass percent solid sample and 90 mass percent lithium borate flux. The solid mixture was heated to 1200° C., mixed, then poured directly into 10 mass percent nitric acid. The final liquid mixture was then cooled to 60° C. and left to mix overnight. This liquid sample was then diluted further in 2% nitric acid, making the sample able to be run in the ICP. The solid sample preparation had slightly less procedure in the final analysis as a large amount of the dissolved solids in the samples were the lithium borate flux that would take up the testable mass in a sample. The dilution amounts were recorded and used to calculate the actual concentrations of the elements in the solid samples.

Thermodynamics
Thermodynamic Models

To understand the leach system thermodynamic calculations were performed using the software HSC Chemistry from Outotec. The purpose of this exercise was to understand if the leach has the thermodynamic driving force to perform desirably. On the most basic level, leaching is a chemical reaction to transform the solid materials you want from an insoluble compound to a soluble one. The goal of the thermodynamic exercise is to show that the leach reaction would create a soluble rare earth compound that can be sent to refining. The leach reactions examined are shown below, with the assumption that the structure of bastnaesite is comprised of a combination of carbonate and fluoride parts. This was done as the HSC database did not contain a proper bastnaesite structure and therefore was approximated using two separate structures.

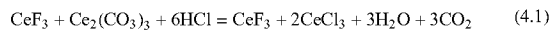
(4.1)

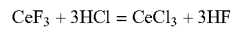

Using the chemical reaction of the leach the Gibbs free energy of the reaction was calculated across a series of temperatures. The chemical equation of the calculation are shown in each chart with the phase of each species, with some differences due to the limits of the HSC data base for rare earth compounds. The solid rare earth species of cerium fluoride and cerium carbonate are shown as aqueous, which was the only species available in the dataset.

Figure 11:
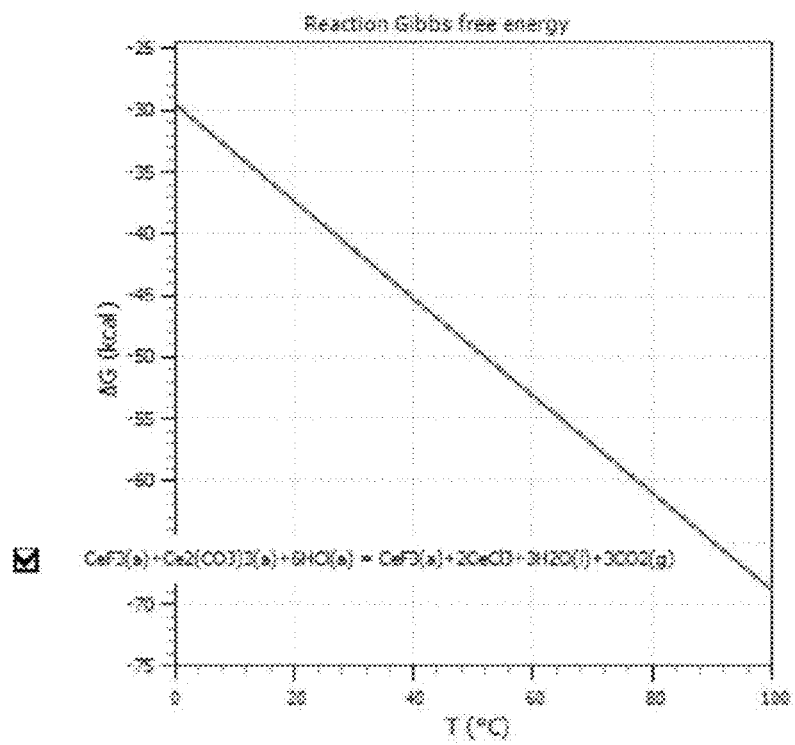
FIG. 11: HSC Gibbs free energy results for the rare earth carbonate reaction.

The results of the Gibbs free energy calculation are shown in FIG. 11. The results shown in the graph are created using the reaction of bastnaesite (with cerium used as the rare earth within the bastnaesite structure), split into carbonate structure and fluoride structure, and hydrochloric acid. These results are for the reaction between hydrochloric acid and the carbonate structure only. The curve indicates from all temperatures from 0° C. to 100° C. the Gibbs free energy of this reaction is −30 kcal/mol and decreasing. The equilibrium constant of this reaction was calculated to be as $2.3 \times 10^{38}$ at 80° C. down to $2.098 \times 10^{29}$ at 25° C. Over this entire temperature range the equilibrium constant indicates that the reaction will occur breaking the carbonate structure. The solubility product constant was calculated for both cerium fluoride and cerium carbonate in water at room temperature being $8 \times 10^{-36}$ and $1.8 \times 10^{-19}$. The solubility constant is the simplified equilibrium constant representing the solubility of a compound in water at atmospheric conditions. The larger the solubility constant the more soluble the material is in water. These values indicate that the cerium fluoride is insoluble in water and needs the addition of other reagents for dissolution. The cerium carbonate would be considered soluble in water but with limited solubility. This indicates that there is a driving force for this reaction to occur. In terms of the leach this reaction is the breaking of the carbonate structure of the bastnaesite to create soluble rare earth chloride. This reaction has been thought to be the first step of the Molycorp leaching process as the hydrochloric leach used to dissolve the carbonate portion of bastnaesite. This is the reaction that is creating carbon dioxide gas and is probably the cause of the foam that was observed in the leach testing. FIG. 11 shows HSC Gibbs free energy results for the rare earth carbonate reaction.

Figure 12:
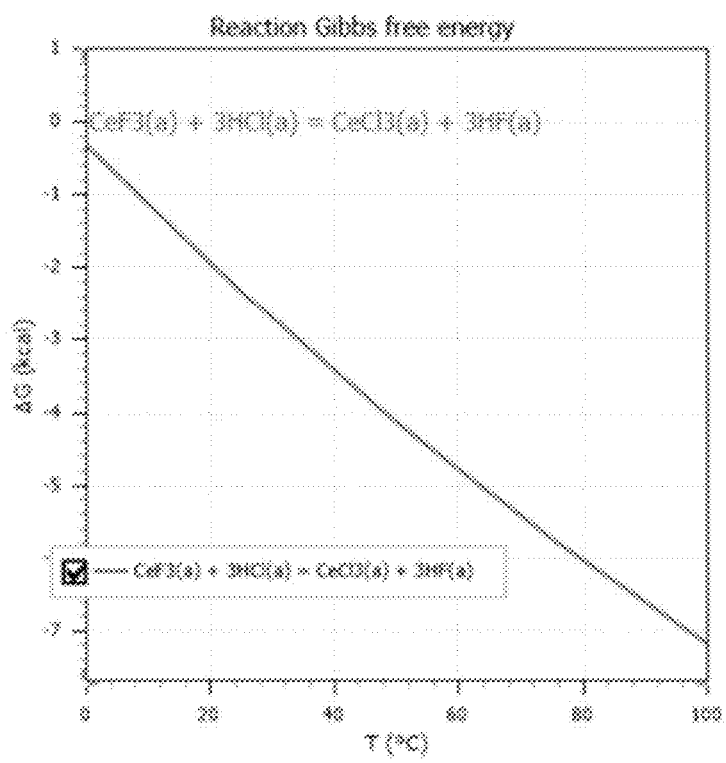
FIG. 12: Results of HSC for bastnaesite hydrochloric fluoride leach reaction.

Confirming that the carbonate reaction had a thermodynamic driving force was the goal of the first calculation, the second calculation was done to understand if the hydrochloric acid can break fluoride structure of bastnaesite. The results of this calculation are shown in FIG. 12.

These results of the calculations show that over the entire temperature range the Gibbs free energy of the reaction goes from −0.2 kcal/mol decreasing to −7.2 kcal/mol. This indicates that there is a thermodynamic driving force for the reaction to occur. The equilibrium constant of this reaction was then calculated to $5.2 \times 10^3$ at 80° C. down to 29 at 25° C. The equilibrium constant then indicates that the reaction does favor the products over the entire temperature but is much closer to equilibrium at lower temperatures. Having a thermodynamic driving forces shows that the fluoride structure of bastnaesite theoretically could be broken using only hydrochloric acid. Though the driving force to break the fluoride is not as strong as the carbonate reaction and is relatively low at lower temperatures. In terms of the leach reaction and availability of increasing the recovery of the leach compared to the caustic crack process, these results indicate that there is a thermodynamic driving force to break the fluoride bond with hydrochloric acid. This means that there is a possibility to recover most if not all the available rare earths solely with a hydrochloric acid leach. FIG. 12 shows results of HSC for bastnaesite hydrochloric fluoride leach reaction.

Following the determination that there is a thermodynamic driving force to react all the available rare earths from the bastnaesite, calculations were done to create Eh-pH diagrams. These calculations are done within HSC and again were performed on the chlorine, fluorine, cerium system. The basis of the calculations was changed to create FIG. 13.

Figure 13:
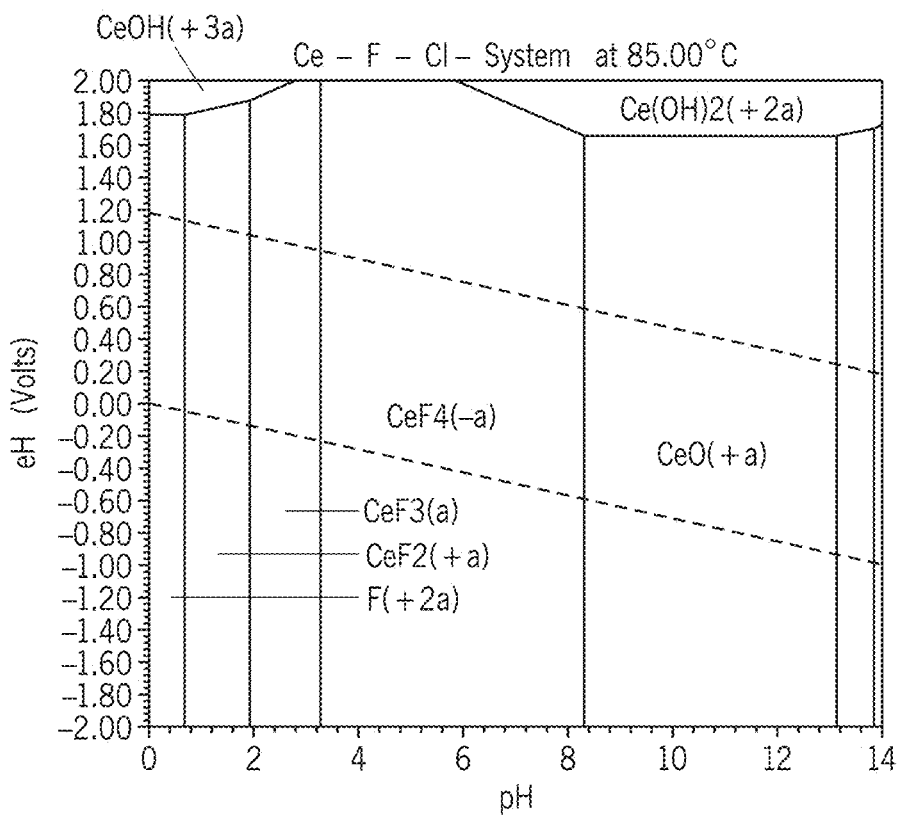
FIG. 13: Eh-pH diagram calculation results with a cerium basis.

The results of this calculation show that over most of the pH spectrum that cerium has the affinity to be in a molecule as a solid fluoride. The only portion of the diagram that has a free fluorine ion is at a pH of 0.8 down to 0 pH. This indicates that there is a thermodynamic driving force for the dissociation of the fluorine ion is at very low pH. This also shows that as the acid is consumed, and the pH grows towards neutral the driving force to dissociate the fluoride diminishes. For the leach this means that it is advantageous to have excess acid to keep the pH very low even after most of the bastnaesite is already reacted. FIG. 13 shows Eh-pH diagram calculation results with a cerium basis.

Figure 14:
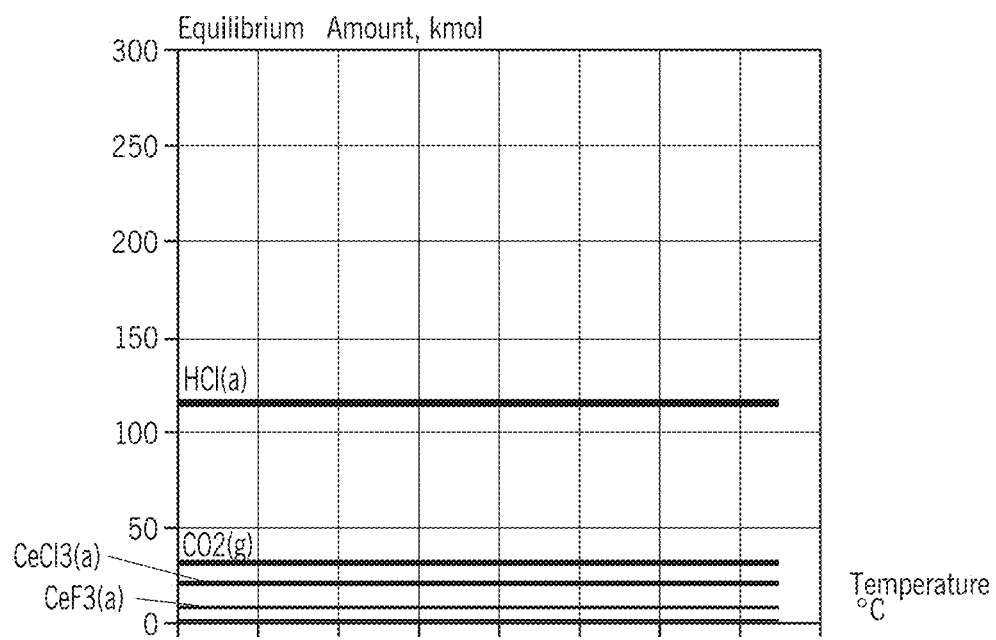
FIG. 14: Results of the equilibrium compositions thermodynamics calculations.

The final thermodynamic calculations are the equilibrium compositions of the bastnaesite hydrochloric acid leach reaction using the same chemical equations as the previous calculations. This was performed using the molecular thermodynamic constants to calculate the composition of a mixture over a variety of temperatures. To do this calculation a 200 kmol basis was used with 150 kmol of HCl reacting with 50 kmol of $CeF(CO_3)$. There is a significant excess of HCl in order to make sure the effect outlined by the Eh-pH diagram isn't shown in the equilibrium calculation. Cerium again used as the rare earth in this compound as it is the most common rare earth in this deposit and the data on cerium is readily available for these calculations. FIG. 14 shows results of the equilibrium compositions thermodynamics calculations.

The results of these calculations are shown in FIG. 14. These results show that over all temperatures the same end composition is shown. This composition is all the bastnaesite is reacted to form 3 different molecules. The first and most abundant is $CO_2$ this molecule is the off gas that is formed during the reaction of the carbonate portion of bastnaesite. The second most abundant is the $CeCl_3$ which is also important as this is the soluble molecule that is formed and puts rare earths into solution that can be later refined. The final molecule formed is the $CeF_3$ this is a cause for concern as this molecule is insoluble and the molecule that has caused the need for the caustic crack in the Molycorp process.

Thermodynamic Conclusions

Using the results of the thermodynamic models a leach process for testing was devised. The thermodynamic models show that there is a reaction path to recover all the rare earths with a hydrochloric acid leach. This reaction path is shown in equation below.

(4.2)

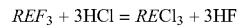

This reaction path is then the leaching path that is looked at to be used to increase the recovery of the leach. The thermodynamic calculations show that both the carbonate and rare earth fluoride structures can be broken with solely a hydrochloric leach. Though the rare earth fluoride is having a significantly lower thermodynamic driving force in the same conditions as the carbonate structure.

Laboratory Leach Testing

In order to test the parameters that affect the recovery of rare earth elements from bench top leach testing was performed. This testing was done in a partially dosed leach cell to limit the loss of mass from off gassing. Each of the sets of tests were designed using a DOE. These are named by the order the tests were performed.

Scoping Leach Test Results

Figure 15:
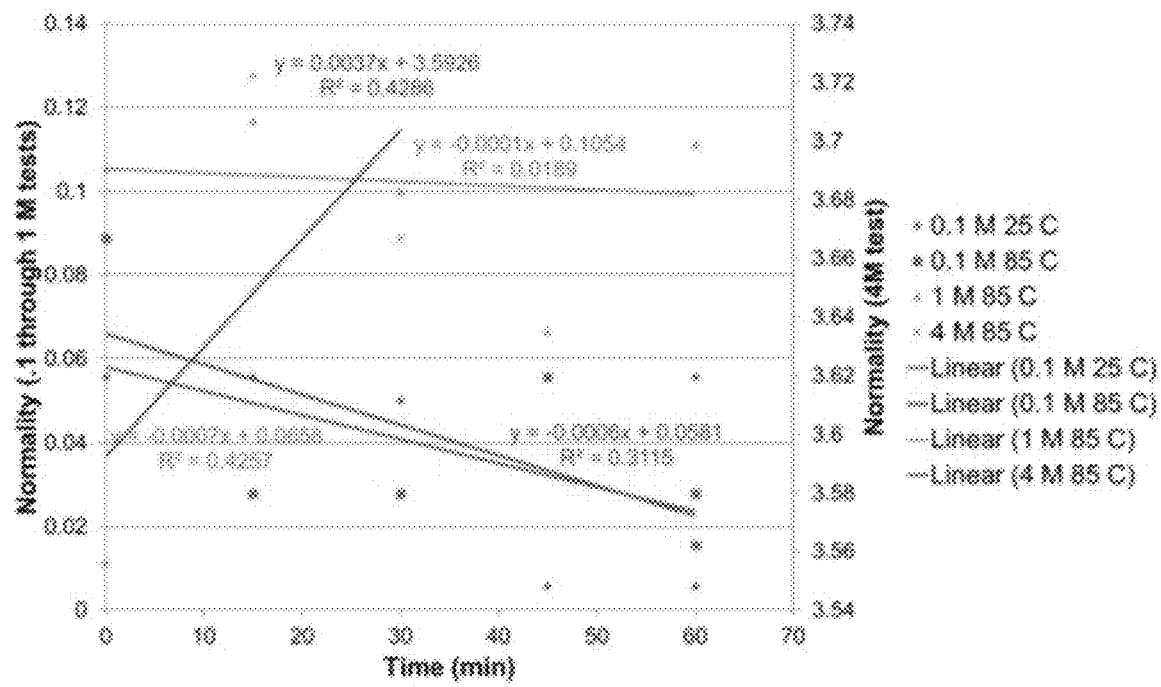
FIG. 15: Titration results of leach acid consumption testing.

To understand the physical nature of the leach reaction a set of scoping leach tests were performed. These tests were to find the best operating procedures for the bench top leach testing. The first step of this testing was to perform leaching and understand how the acid is consumed during these tests. These tests were run with 20 gram per liter of solids in 500 mL of hydrochloric acid. The samples taken during the leaching procedure was then titrated using 1 M sodium hydroxide with methyl orange indicator recording the volume of sodium hydroxide needed for the indicator to change color. The results of these tests are shown in FIG. 15.

The titration results show that from normalities 0.1 M to 1 M of hydrochloric acid all titrations showed that all the acid normality was essentially zero over all times. This indicates that the acid is consumed as it's added to the leach, therefore the leach reaction is happening almost instantaneously. The samples at time zero were taken after the acid was added. For the 4 normal leach the concentration rose from 3.6 M to 3.7 M over the hour of leaching. This is most likely titration error but indicates again that the normality stayed mostly the same over all the test samples, indicating that the leach reaction is probably occurring as the acid is added to leach.

Following the acid consumption testing a series of leach tests were done to ensure the testing set up. These were just a handful of tests done at 10 gram per liter of solids done in a 2 liter container with a series of normalities and temperatures. FIG. 15 shows titration results of leach acid consumption testing.

Figure 16:
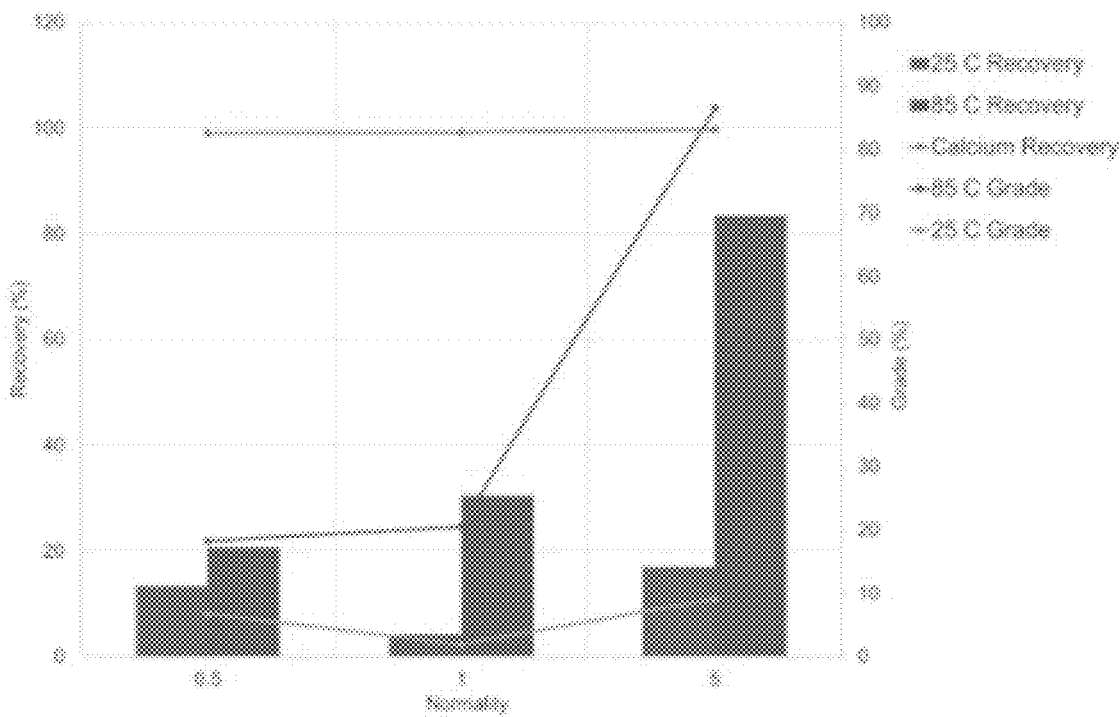
FIG. 16: Results of the scoping leach tests with REE recovery and REE grade shown.

FIG. 16 shows the results of these scoping leach tests. These results show that over all acid concentrations increasing temperature lead to higher rare earth recovery. Also, generally as the acid concentration increased so did the rare earth recovery. Increasing temperature increased REE grade, the jump from 25° C. to 85° C. increased the rare earth grade over all acid concentrations. The calcium recovery of the 85° C. tests is also shown and stays at 100% over all concentrations. The result over all acid concentrations having 100% calcium recovery shows that the calcite must be reacting first consuming the acid, then the bastnaesite beginning to react. The other major trend is increasing temperature, and acid concentration increases rare earth grade and recovery.

DOE1 Matrix Results

The next batch of testing was the testing done within the DOE1. These tests were looking at the test parameters of particle size, time length of leach, the temperature of the leach, the acid normality, and the amount of calcium carbonate in the leach. An experiment was designed using a DOE to jointly test all these parameters at once. The results of all the tests DOE1 indicate that there are more optimal parameters for the leach. There were tests with rare earth recovery around 95%, as determined by XRF analysis on the feed and solid tails. This 95% recovery Is significantly higher than the 70% maximum shown to the be recovery limited by rare earth fluoride. This then indicates this process of a single leach can dissolve most, if not all, the bastnaesite and keep the rare earths in solution. The very low slurry density of this leach may allow the rare earths to dissolve and stay in solution without producing the rare earth fluoride that has been the structure most difficult to dissolve. FIG. 16 shows results of the scoping leach tests with REE recovery and REE grade shown.

Both ICP and XRF were used in order to compare the analysis procedures. The XRF only being used on the solids and ICP being used on both the liquid and solid samples. Comparing both series of results both XRF and ICP follow the same patterns in terms of what test had higher recovery than others, though the ICP had some results which had recovery above 100%. This may be due to the very small sample sizes needed when testing within the ICP. Overall the ICP confirmed the trends of the XRF and the XRF results were then looked at with statistical analysis. The XRF and ICP results from this experiment are shown in Appendix.

An example of the REE mass balance is shown in Table 9.

TABLE 9

Example REE mass balances from DOE1 ICP analysis.

| STD Order | Recovery XRF REE | ICP Results Con REE Mass | Feed REE Mass | Tails REE Mass | REE Recovery | Mass Loss |
|---|---|---|---|---|---|---|
| 26 | 32.24875152 | 2.437513307 | 4.992708862 | 2.424592863 | 48.82145894 | 0.130602692 |
| 27 | 29.06479928 | 1.60589405 | 4.959998822 | 3.316920091 | 32.37690387 | 0.03718468 |
| 28 | 21.92182841 | 0.974384881 | 4.992774216 | 3.883879353 | 19.51590115 | 0.134509983 |
| 29 | 20.49195591 | 0.527644239 | 4.960096854 | 4.436308678 | 10.63778098 | −0.003856064 |

TABLE 9-continued

Example REE mass balances from DOE1 ICP analysis.

| STD Order | Recovery XRF REE | ICP Results Con REE Mass | Feed REE Mass | Tails REE Mass | REE Recovery | Mass Loss |
|---|---|---|---|---|---|---|
| 30 | 34.21115858 | 1.152268002 | 4.93238645 | 3.805386643 | 23.36126769 | −0.025268195 |
| 31 | 27.29790902 | 1.007416164 | 4.908793395 | 3.849905256 | 20.52268415 | 0.051471975 |
| 32 | 90.14307022 | 4.437572756 | 4.880658186 | 0.384427915 | 90.92160498 | 0.058657515 |
| 33 | 87.29121734 | 4.388632774 | 4.897879156 | 0.53057695 | 89.60271649 | −0.021330568 |
| 34 | 92.84622443 | 5.20110239 | 4.896375997 | −0.331659962 | 106.2235088 | 0.026933569 |
| 35 | 91.99005816 | 5.784238269 | 4.947189296 | −0.798175939 | 116.9196876 | −0.038873034 |
| 39 | 14.85613027 | 0.396150858 | 4.903761081 | 4.405824844 | 8.078510588 | 0.101785379 |

These show that the feed mass, concentrate mass, and tails mass of the REE's in the sample as tested in the ICP. These balances show there is limited error in the mass balance in the ICP analysis results. Appendix also shows how much total REE mass was not accounted for in the analysis, along with the recovery that mass corresponds too. The maximum error that is shown is under 5% recovery indicating that the results can be taken as quantitative.

After assessing the XRF results are probably most useful in comparing the impacts of the parameters so, a statistical analysis using the software Minitab was performed. The purpose of this analysis was to look at the Impact of each parameter and see which had any statistical impact on the rare earth recovery of the leach.

Figure 17:
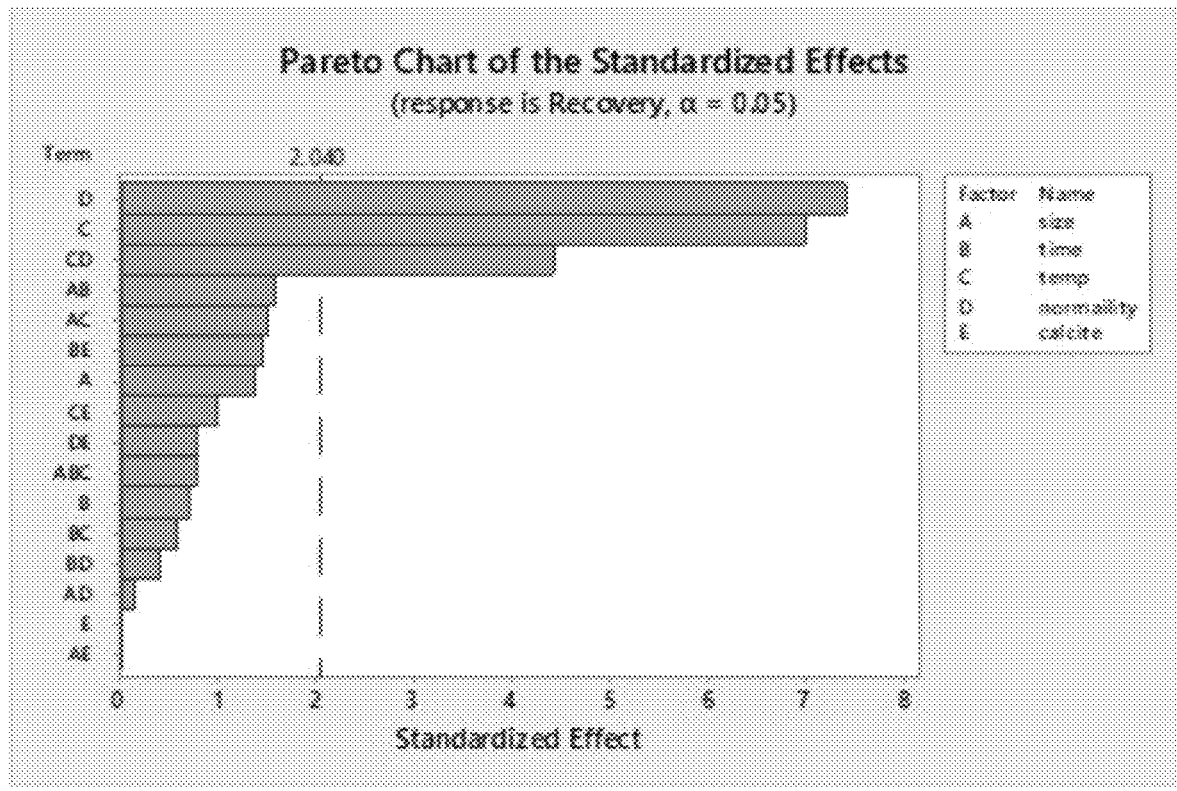
FIG. 17: Pareto chart of the effects of leach parameters on rare earth recovery of DOE1.

FIG. 17 shows the Pareto chart of the effects of parameters and joint reactions of parameters on the rare earth recovery in the leach. A Pareto chart is used to visualize the impacts of the parameters of a DOE matrix on a single response variable. The confidence interval used in this calculation is 95% with the significant standardized effect shown as the dashed red line in FIG. 17. The response was measured is standardized using recovery, and the parameters that exceed the significant factor are those that had a statistical impact on the leach recovery. For the results of DOE1 the parameters that were statistically important on the recovery response were the acid normality, the leach temperature, and the joint reaction between temperature and normality. This analysis indicates that all the other parameters did not have a statistical impact on the rare earth recovery. Though statistically only temperature and acid normality had major impacts all the parameters were then measure for their independent impacts on rare earth recovery. FIG. 17 shows Pareto chart of the effects of leach parameters on rare earth recovery of DOE1.

Figure 18:
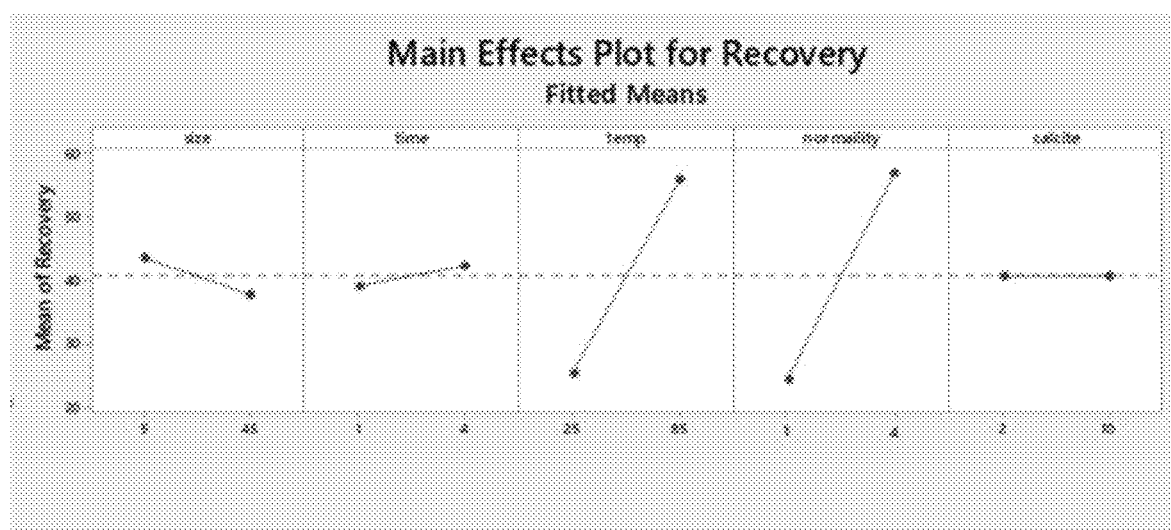
FIG. 18: Main effect results of the DOE1 testing parameters.

FIG. 18 shows the results of the effects of the DOE1 leach parameters. The size parameter did have a small impact according to the results with decreasing rare earth recovery corresponded to increasing particle size. Decreasing the particle size did have an impact on the amount of foaming that occurred during the leach. Grinding to the smaller size essentially eliminated the foaming that occurred during the addition of the acid. One thought on this elimination of foaming may be due to the smaller particles having a smaller product layer being developed compared to the larger particle size that may catch bubbles and be brought to the surface of the leach forming the froth. The next parameter was the time length of the leach, which slightly increased the recovery with increasing time though the impact is slight. FIG. 18 shows main effect results of the DOE1 testing parameters.

This is consistent with the previous acid consumption testing that showed that showed that the reaction occurred very quickly. Temperature of the leach had a major impact on recovery as increasing the rare earth recovery from 25% to 60% by solely increasing the temperature from 25° C. to 85° C. Acid normality also had a major impact on recovery increasing over the same range as temperature by increasing acid concentration from 1 M to 4 M HCl. The final parameter was the calcium carbonate added to the leach. This had essentially no impact on the leach, with no change to the recovery by changing concentration. Then looking at the interaction of calcite concentration and normality in the Appendix, the addition of calcite decreased the recovery at low normality leaches. This follows the scoping leach test results as well as the calcium carbonate seemed to react first consuming the free acid, which the addition of calcium carbonate would have a larger impact on recovery when there is less acid in the leach. One thought of this is that there was not enough calcium carbonate added to the leach to make an impact but the concentration of calcium was significantly higher than the concentration of rare earth fluoride, along with continuing to add calcium carbonate would consume more acid increasing the operating cost of the leach.

Figure 19:
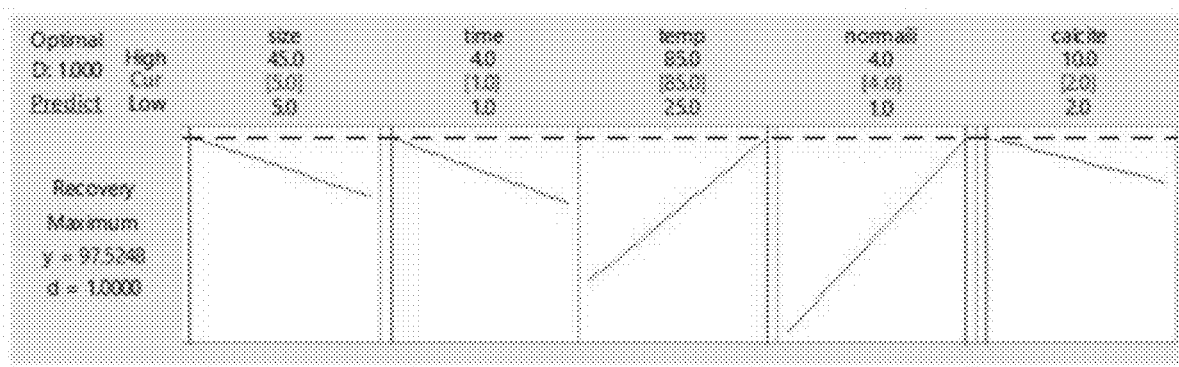
FIG. 19: Optimal statistical results and parameter levels of DOE1 leach results.

Looking at the impact of all the parameters an optimal leach from these results was calculated. The level of all these parameters are outlined in FIG. 19, which shows optimal statistical results and parameter levels of DOE1 leach results.

The results of the statistical optimal leach model lead to a leach with a particle size of 5 micron, a leach time of 1 hour, at 85° C., 4 normal hydrochloric acid, and no additional calcium carbonate added. These conditions would then lead to a maximum rare earth recovery of 97.52%. This result is interesting as the time of the leach being 1 hour is the opposite result of the individual parameter impact outlined in FIG. 18, though this calculation takes into account the parameter interactions which may have led to the 1 hour test being optimal. The optimal condition of being 1 hour may also be due to the fact that the time parameter had such a low impact on the reaction that small errors pushed the 1 hour tests slightly ahead of the corresponding 4 hour tests. All other parameters followed the same impact as their individual impacts.

The tested particle size suggests that p80 sizes less than about 50 μm may lead to similar recoveries. In some embodiments, the particle size may vary (wherein particle size is based upon p80 values) between about 1 and 100 μm, such as 2 and 50 μm, 2 and 25 μm, and 2 and 10 μm. In many embodiments the particle size may be greater than about 1 μm, 2 μm, 3 μm, 4 μm, 5 μm, 6 μm, 7 μm, 8 μm, 9 μm, 10 μm, 15 μm, 20 μm, 25 μm, 30 μm, 40 μm, 50 μm, 60 μm, 70 μm, 80 μm, or 90 μm, and less than about 100 μm, 90 μm, 80 μm, 70 μm, 60 μm, 50 μm, 45 μm, 40 μm, 35 μm, 30 μm, 25 µm, 20 µm, 19 µm, 18 µm, 17 µm, 16 µm, 15 µm, 14 µm, 13 µm, 12 µm, 11 µm, 10 µm, 9 µm, 8 µm, 7 µm, 6 µm, 5 µm, 4 µm, and 3 µm.

The normality of the slurry may vary from about 1 to 8 N. In many embodiments, the normality is about 2 to 7N or 3 to 6N, for example about 3 to 5N. In many embodiments, the normality is greater than about 1.0N, 1.5N, 2.0N, 2.5N, 3.0N, 3.5N, 3.6N, 3.7N, 3.8N, 3.9N, 4.0N, 4.1N, 4.2N, 4.3N, 4.4N, 4.5N, 4.6N, 4.7N, 4.8N, 4.9N, 5.0N, 5.5N, 6.0N, 6.5N, 7.0N, 7.5N, or 8.0N, and less than about 9.0N, 8.0N, 7.5N, 7.0N, 6.5N, 6.0N, 5.5N, 5.0N, 4.9N, 4.8N, 4.7N, 4.6N, 4.5N, 4.4N, 4.3N, 4.2N, 4.1N, 4.0N, 3.9N, 3.8N, 3.7N, 3.6N, 3.5N, 3.3N, 3.4N, 3.2N, 3.1N, 3.0N, 2.5N, 2.0N, 1.5N, or 1.0N.

The leach may be conducted at various temperatures, for example from about 25° C. to about 100° C. In most embodiments, the temperature is greater than about 25° C., 30° C., 35° C., 40° C., 45° C., 50° C., 55° C., 60° C., 65° C., 70° C., 75° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C., 110° C., or 120° C., and less than about 150° C., 120° C., 110° C., 100° C., 99° C., 98° C., 97° C., 96° C., 95° C., 94° C., 93° C., 92° C., 91° C., 90° C., 89° C., 88° C., 87° C., 86° C., 85° C., 84° C., 83° C., 82° C., 81° C., 80° C., 79° C., 78° C., 77° C., 76° C., 75° C., 70° C., 65° C., 60° C., 55° C., 50° C., 45° C., 40° C., 35° C., or 30° C.

The disclosed single leach step for recovery of REE may be conducted for various durations, from about 30 min to about 200 min. In most embodiments, the duration is from about 45 min to about 90 min, or about 1 hour. In many embodiments, the duration is greater than about 30 min, 40 min, 41 min, 42 min, 43 min, 44 min, 45 min, 46 min, 47 min, 48 min, 49 min, 50 min, 51 min, 52 min, 53 min, 54 min, 56 min, 55 min, 57 min, 58 min, 59 min, 60 min, 61 min, 62 min, 63 min, 64 min, 65 min, 66 min, 67 min, 68 min, 69 min, 70 min, 71 min, 72 min, 73 min, 74 min, 75 min, 76 min, 77 min, 78 min, 79 min, 80 min, 81 min, 82 min, 83 min. 84 min, 85 min, 86 min, 87 min, 88 min, 89 min, 90 min, 100 min, 110 min, 120 min, 130 min, 140 min, 150 min, 160 min, 170 min, 180 min, 190 min, or 200 min and less than about 240 min, 200 min, 190 min, 180 min, 170 min, 160 min, 150 min, 140 min, 130 min. 120 min, 110 min, 100 min, 90 min, 89 min, 88 min, 87 min, 86 min, 85 min, 84 min, 83 min, 82 min, 81 min, 80 min, 79 min, 78 min, 77 min, 76 min. 75 min, 74 min, 73 min, 72 min, 71 min, 70 min, 69 min, 68 min, 67 min, 66 min, 65 min, 64 min. 63 min, 62 min, 61 min, 60 min, 59 min, 58 min, 57 min, 56 min, 55 min, 54 min, 53 min. 52 min, 51 min, 50 min, 49 min, 48 min, 47 min, 46 min, 45 min, 43 min, 42 min, 41 min, 40 min. 30 min, 20 min, or 10 min.

The results of DOE1 show that the parameters that have major impacts on the leach recovery are only acid normality, and temperature of the leach. This is important in an engineering sense as the amount of time and energy used to grind the flotation concentrate to 5 micron had little to no impact to the recovery of the leach. Also, the addition of excess calcium carbonate outside of the calcite already found in the flotation concentrate had no impact on the recovery. This shows that the thought that additional calcium in the leach slurry would be able to attract fluorine from the rare earths does not seem to hold. Time was looked at as well in this test and running the leach for longer had little impact on the leach recovery. The addition of increasing calcium carbonate was not looked at as the addition of calcium carbonate will continue to increase the acid consumption and increase the energy needed to heat the leach to the optimal temperature. All these results together would indicate that if the process were to be advanced to an industrial scale that additional grinding, additional calcium carbonate, and long leach retention times do not greatly increase the recovery of the leach.

DOE2 Matrix Results

Following the results of DOE1, the advisers to the research expressed concern that the 15 gram per liter solid density would not be realistic on an industrial scale. Therefore, a second DOE was developed to understand how an increase in slurry density would affect the rare earth recovery of the leach. DOE2 also included particle size as part of the testing, as the thought that shrinking the particle size, and increasing the surface area would change the kinetics at higher slurry densities.

Figure 20:
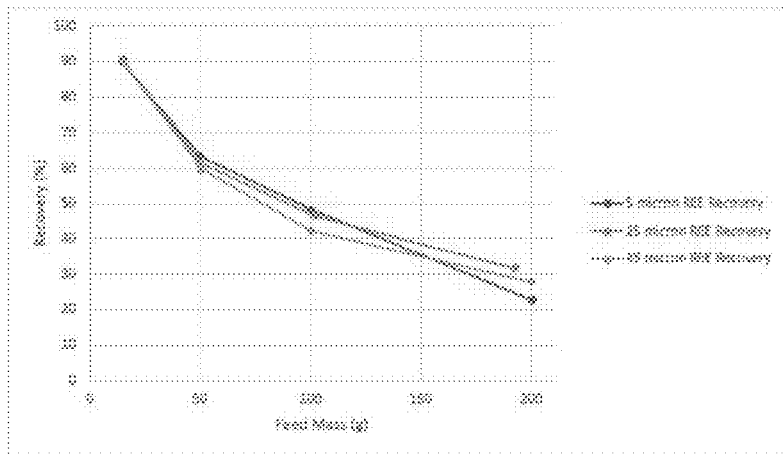
FIG. 20: Results of the slurry density DOE2 testing.

DOE2 then was tested over the same particle size ranges as DOE1, along with the flotation concentrate feed 15, 50, 100, and 200 grams per liter of solution. The testing performed was done at the optimal time, temperature, and normality. The results of this testing are shown in FIG. 20. The data from these tests are shown in Appendix.

These results show that as the slurry density increases the rare earth recovery of the leach decreases dramatically. From the 15 gram per liter test to the 200 gram per liter test the rare earth recovery dropped from 90% recovery down to around 30% recovery at 200 gram per liter. The results also show that over the entire range of slurry densities the recovery difference of the three particle sizes are relatively small compared to the difference seen by changing the slurry density. This result holds with the results from the DOE1 that particle size has no real impact on the recovery of the leach. FIG. 20 shows results of the slurry density DOE2 testing.

Slurry density of the leach may vary from about 5 g/l to about 100 g/l. In many embodiments, the slurry density, in grams or ore per liter of slurry, may be between about 5 g/l and about 200 g/l, for example between about 6 g/l and 100 g/l or 6 g/l and 25 g/l, or about 9 g/l to about 21 g/l. In some embodiments, the slurry density may more than about 4 g/l, 5 g/l, 6 g/l, 7 g/l, 8 g/l, 9 g/l, 10 g/l, 11 g/l, 12 g/l, 13 g/l, 14 g/l, 15 g/l, 16 g/l, 17 g/l, 18 g/l, 19 g/l, or 20 g/l, and less than about 25 g/l, 22 g/l, 21 g/l, 20 g/l, 19 g/l, 18 g/l, 17 g/l, 16 g/l, 15 g/l, 14 g/l, 13 g/l, 12 g/l, 11 g/l, 10 g/l, 9 g/l, 8 g/l, 7 g/l, or 6 g/l.

Following the observing the results from DOE2 a thought was that a multistage leach would maybe help the recovery. This test was to look if leaching the solid tails from another test would lead to increase recovery of the leach. Therefore, a leach was performed with a slurry density of 200 gram per liter, with 2 liters of slurry. Then the solids were dried, and a leach was performed again running the tails in the same conditions as the first leach. This led to a recovery in the first leach of 32.0%, and a recovery after the second leach was 66.6%. The multi-stage test increased the recovery over the single stage test but was not advanced as filtering and drying samples between tests added to much time to be industrially viable.

This test shows how even with a multistage leach the recovery is significantly less than the 95% recovery of the low slurry density single stage leaches. This is likely due to the production of the insoluble rare earth fluoride during the initial leach reaction, this fluoride being almost impossible to dissolve using the same leaching conditions. This test shows to reach recoveries higher than the 70% the rare earth fluorides cannot be allowed to form. These rare earths then need to stay below some solubility limit to keep from reacting and forming the fluoride.

Recovery of the REE from the disclosed single-stage leach process may vary, but is greater than existing methods, and generally greater than about 70%. For example, 70 to 99%. In many embodiments, recovery of REE is greater than about 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%, and less than about 100%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 73%, 74%, 72%, or 71%.

Following the multi-stage test the leach results were sent to Hazan Laboratories for ion selective probe (ISP) fluoride testing. This was done to try and understand how the fluorine in bastnaesite behaved with the increasing slurry density.

Figure 21:
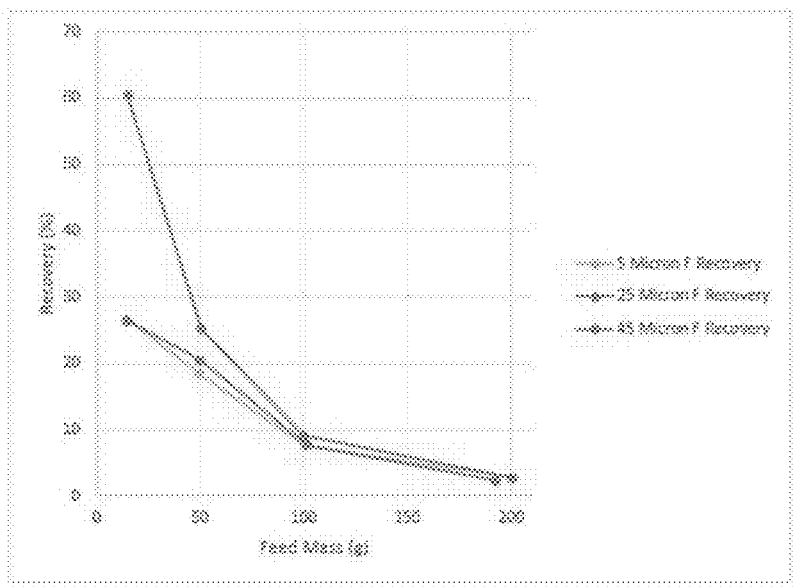
FIG. 21: Fluoride ion chromatography results of DOE2.

The results of this ISP are shown in FIG. 21. This shows that as the slurry density of the leach Increases the fluoride recovery in the leach slurry decreases. The fluoride recoveries are much lower than the rare earth recovery. This lower recovery makes sense with theory though as some of the hydrogen fluoride will be lost as gas during the leach. What is also shown from the results is that at low slurry densities the particle size of 45 micron had much higher fluorine recovery than the smaller particle sizes. Therefore, at low slurry densities the fluoride structure would have free acid left after the carbonate is broken to continue to react and break the fluoride. This purposes an interesting result as grinding to a smaller size sees less fluorine in the leach liquor. Though this may be due to the foaming issue that has been mentioned before. The 45 micron tests had much more foaming than the other two particle sizes. This may be limiting the amount of hydrogen fluoride gas that is released during the beginning of the test. This Is the only physical difference seen between the tests, so the foam could be keeping the fluorine from off gassing. FIG. 21 shows fluoride ion chromatography results of DOE2.

This material was then sent to Dr. Paul Miranda at Eagle Engineering for AMICS analysis on the leach solid tails. The results of this analysis are shown in Table 10.

TABLE 10

AMICS results of DOE2 testing.

| Sample | Bastnaesite Percentage | Calculated Routine | Bast Recovery | REE Recovery | Flouride Recovery |
|---|---|---|---|---|---|
| Feed | 42.28 | 2.96 | | | |
| 1T | 1.39 | 0.1 | 99.33650284 | 89.81576262 | 99.31818346 |
| 2T | 1.91 | 0.13 | 99.12619108 | 90.48488661 | 99.15048759 |
| 3T | 1.64 | 1.64 | 99.23783747 | 89.82264441 | 89.11343516 |
| 4T | 16.14 | 1.13 | 86.65763944 | 63.44788458 | 86.65708089 |
| 5T | 18.43 | 1.29 | 84.0380729 | 61.50799819 | 84.04146701 |
| 7T | 41.12 | 2.88 | 55.51779636 | 48.23644547 | 55.49908474 |
| 8T | 41.5 | 2.91 | 55.14560057 | 46.60751948 | 55.07447034 |
| 2× Leach | 20.48 | 1.43 | 93.92747855 | 66.68 | 93.94354618 |

The full results of this testing are shown in Appendix. This analysis shows that essentially all the fluoride contained in the leach are held within the bastnaesite and parasite minerals. The AMICS results shown along with the recovery of leach associated with each test shows that as the material is leached the amount of bastnaesite is reduced and this correlated to a reduction of fluoride in the solid tails. Across all tests the bastnaesite recovery in the leach liquid is higher than the REE recovery. This then indicates that the bastnaesite is being broken down in the leach, though some of the REE is lost due to processes outside the dissolution of the rare earth fluorocarbonate structure. The fluorine analysis shows that in the high recovery leaches the fluoride was dissolved along with the bastnaesite essentially converting all the fluoride from the fluorocarbonate structure. The entire AMICS modal mineralogy results are shown in Appendix. These results show again the almost entire dissolution of bastnaesite from the solid tails. The important result is that non valuable mineral of barite Is essentially unreacted across all tests with the tails containing the same mass of barite as the feed.

DOE3 Results

Figure 22:
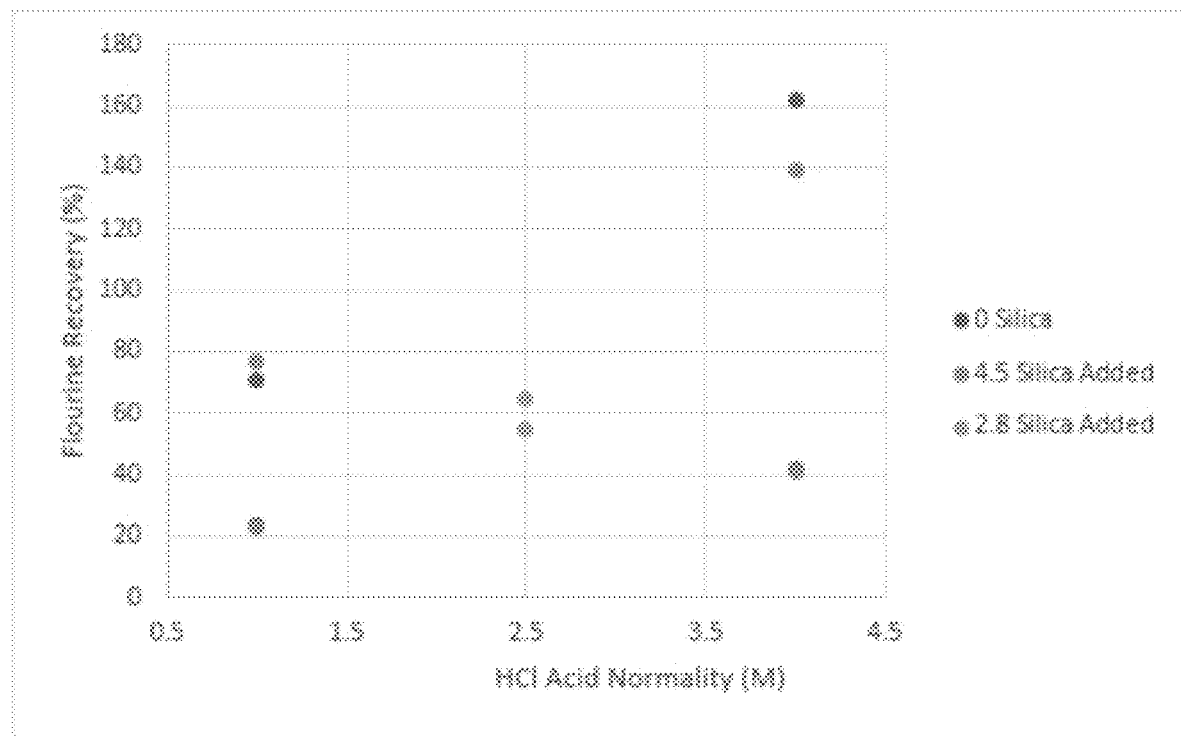
FIG. 22: Fluorine recovery results of DOE3.

After looking at the fluoride results from DOE2 the idea was formalized that removing hydrogen fluoride (HF) from solution would keep REE from precipitating and lowering the recovery of the leach. HF in large quantities would also cause issues in an industrial setting as the HF must be neutralized in order to discharge the leach liquor after stripping the rare earths in refining. Therefore, this testing was set up to see if the addition of silica would be able to limit the amount of fluorine ions in the leach liquor. The results of this testing are shown in FIG. 22, which shows fluorine recovery results of DOE3.

The goal of this testing was to test the hypothesis that the addition of silica would capture the fluoride from solution and precipitate out. The results show that really the addition of silica didn't affect the fluoride recovery over any acid normality. The results of these tests are not very precise as any small amounts of silica that dissolved would affect the ISE results greatly. The results do show that 4.5 gram of silica series lay at the same points as the 0 gram of silica added. This indicates that the addition of silica probably didn't affect the amount of fluorine in the leach solution at all.

Economics

Following lab testing and concluding bastnaesite leaching with only HCl acid would produce rare earth leach recoveries up to 95%, an economic analysis was performed to compare the installation of a single stage HCl leach only circuit compared to the historic two stage leach caustic crack circuit. In order to perform this analysis, the operating and initial costs were compared between the two processes. The single stage leach only process would be performed in the same leaching and cracking facilities that would be present in leach-crack plant, with the addition of two leach vessels. This was chosen as the only bastnaesite facility in the US has this leach crack system in place.

The assumption for these economic models is that the flotation circuit would be the same process for both models with a 60% recovery and a grade of 33% REO. The HCl leach only circuit would have a recovery of 85% representing a slurry density of 20 gram per liter of flotation concentrate, this being lower than the optimal 95% to be able to process at the lowest slurry density recommended for the pumps. The Leach caustic crack circuit was represented with a recovery of 65% as this is the stated recovery in literature. Also, all the value of the materials produced does not consider the processes after the leach as these would essentially be the same for both leach methods. The final products that are considered are cerium oxide (>99.5%), lanthanum oxide (>99.5%), neodymium oxide (>99.5%), and praseodymium oxide (>99%). Taxes and downstream processing are not considered or calculated as these values would be very similar between the processes.

Capital Costs

The capital costs for the two dissolution circuits were calculated using CostMine 2019. The sizes of the equipment were sized with a factor of safety of 2 for volumes of reaction vessels and 2.5 for all other equipment. This was just to make sure the equipment purchases would operate in all feed conditions. The costs associated with the leach only circuit are shown in Table 11 and the costs associated with the leach caustic crack circuit are shown in Table 12.

TABLE 11

Capital cost of HCl leach circuit.
HCl Leach Circuit

| Equipment | Price per Unit($) | Size or Power | Amount | Total |
|---|---|---|---|---|
| Feeder | $3,400.00 | 2 hp | 8 | $27,200.00 |
| tanks | $169,400.00 | 32.5 ft Diameter | 8 | $1,355,200.00 |
| Solution Heater (NG) | $78,657.00 | 3,000,000 BTU | 4 | $314,628.00 |
| Conveyor | $11,192.95 | 2.5 hp | 2 | $22,385.90 |
| Thickener | $380,132.76 | 35 ft Diameter | 1 | $380,132.76 |
| Mixer | $104,000.00 | 13 hp closed Tank | 10 | $1,040,000.00 |
| Slurry Pump | $21,596.00 | 2 hp | 10 | $215,960.00 |
| Slurry Sampler | $20,500.00 | | 2 | $41,000.00 |
| | | | Total | $3,400,000.00 |

The total capital costs were the calculated by using Mulars "Factored Capital Cost Estimate Guide." These factors and the corresponding price estimates are shown in Table 13.

Operating Costs

The next portion of the economic study was to assess the operating costs of each of the leach circuits. To do this the equipment lists created in the for the capital costs model to evaluate the amount of electricity needed, shown in Appendix. These estimates were created using the CostMine 2019 estimates. The next portion of the operating expenses is the labor costs associated with each of leach circuits. This was done with CostMine 2019 and assumed that both circuits require the same amount of labor as the actual circuit size is very similar. These values are an estimate for the economic model comparison.

Reagents prices and amounts were calculated to estimate the reagent costs of the leaching circuits. Prices of the reagents were estimated from a few industrial providers and the Kemcore chemical prices were used as they fell in the center of the few prices that were quoted. The reagent usage was calculated by the estimated leach and crack conditions from literature.

TABLE 12

Capital costs associated with a leach caustic crack circuit.
HCl Leach Caustic Crack Circuit

| Equipment | Price per Unit($) | Size or Power | Amount | Total |
|---|---|---|---|---|
| Feeder | $3,400.00 | 2 hp | 16 | $54,400.00 |
| tanks | $169,400.00 | 32.5 ft Diameter | 16 | $2,710,400.00 |
| Solution Heater (NG) | $78,657.00 | 3,000,000 BTU | 4 | $314,628.00 |
| Conveyor | $11,192.95 | 2.5 hp | 2 | $22,385.90 |
| Thickener | $380,132.76 | 35 ft Diameter | 1 | $380,132.76 |
| Mixer | $104,000.00 | 13 hp closed Tank | 10 | $1,040,000.00 |
| Slurry Pump | $21,596.00 | 2 hp | 10 | $215,960.00 |
| Slurry Sampler | $20,500.00 | | 4 | $82,000.00 |
| | | | Total | $4,800,000.00 |

TABLE 13

Total capital costs as calculator using
"Factored Capital Cost Estimate Guide".

| Cost | Factor | Capital Cost HCl Leach | Capital Cost Caustic Crack |
|---|---|---|---|
| Equipment Cost | | $3,400,000.00 | $4,800,000.00 |
| Installed equipment cost | 0.43 | $1,462,000.00 | $2,064,000.00 |
| Piping/Instrumentation | 0.54 | $1,836,000.00 | $2,592,000.00 |
| EPC/EPCM | 0.37 | $1,258,000.00 | $1,776,000.00 |
| Building @ Existing Site | 0.29 | $986,000.00 | $1,392,000.00 |
| Total Plant Cost | | $8,942,000.00 | $12,624,000.00 |
| Contractor Fees | 0.17 | $1,520,140.00 | $2,146,080.00 |
| Contingencies | 0.2 | $1,788,400.00 | $2,524,800.00 |
| Total Capital Costs | | $12,300,000.00 | $17,300,000.00 |

TABLE 14

Estimates on labor costs for leach circuits.

| Labor Costs | Amount | Hourly Wage | Hourly Total |
|---|---|---|---|
| Metallurgist | 1 | $39.54 | $39.54 |
| Mechanic | 1 | $28.01 | $28.01 |
| Laborer's | 6 | $20.87 | $125.22 |
| Control room Operator | 2 | $20.87 | $41.74 |
| | | Total Hourly | $235 |
| | | Total Daily | $5,628 |

TABLE 15

Reagent estimate costs and usage for the leach circuits.

| Reagent | Kg/ton Leach Only | kg/ton Caustic Crack | Cost per kg |
|---|---|---|---|
| HCl | 4,375 | 8.75 | $1.74 |
| NaOH | 0 | 300 | $0.13 |

Revenue Estimates

To then estimate the value created by the leach processes a value of the four largest products of the circuit. The values of the products were sourced from online sources. All the prices are from 2019, this was chosen to avoid the large change in prices that may have occurred in the beginning of 2020. The composition of the rare earth oxide was sourced from previous literature estimates.

Economic Model Results

The values estimated were then used to create a 10-year cash flow model for both leach systems. These models were then used to calculate net present value (NPV), internal rate of return, and payback period of each of the leach systems. Each model was run as if the system was put in place new and ran for a 10-year period. The entire cash flows are shown in APPENDIX. The results of the models are shown in Table 17.

TABLE 16

Rare earth oxide revenue estimates and REO content.

| Product | price/kg | % of REO Product |
| --- | --- | --- |
| Cerium Oxide (>99.5%) | $3.20 | 50.00% |
| Lanthanum Oxide (>99.5%) | $6.74 | 33.00% |
| Praseodymium Oxide (>99%) | $48.20 | 4.00% |
| Neodymium Oxide (>99.5%) | $47.10 | 12.00% |

TABLE 17

Results of the 10-year cash flow models for the leach systems.

| | HCl Leach | Leach Caustic Crack |
| --- | --- | --- |
| NPV | $1,950,000,000.00 | $1,400,000,000.00 |
| IRA | 2499% | 1248% |
| Payback Period (Years) | 0.036 | 0.05 |

Figure 23:
FIG. 23: Sensitivity analysis results of the HCl leach only model.
Figure 24:
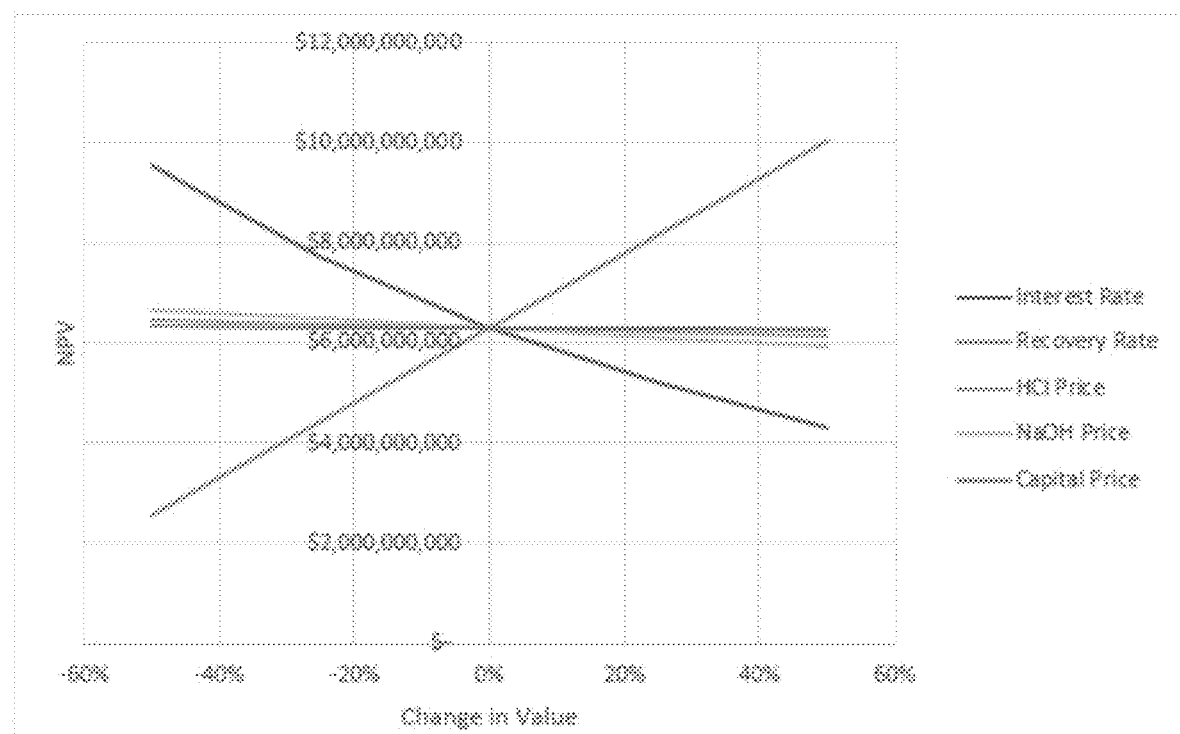
FIG. 24: Sensitivity analysis of leach caustic crack model.

Following the NPV estimation of each leach circuit a sensitivity analysis was conducted on each of the circuits to understand how each of the values created would change with changing parameters. These results are shown in FIG. 23 and FIG. 24. These results indicate that both NPV's are greater than zero indicating that the Installation of each system would be profitable. The IRR of both models were both greater than zero indicating again that the installation of either method would create more value than would be used. The models show that the NPV of the leach only circuit is 0.5 billion higher than the leach caustic crack circuit. Internal rate of return in the leach only circuit is 1000% higher as well, also the payback period is 5 days less in the leach only circuit.

These results show the changes in NPV when compared to the change in parameters by different percentages. The lines that have the steepest slope are those that impact the NPV of the model the most. In both models the steepest lines are the recovery rate of the leach circuit and the interest rate. What is also shown is that the reagent prices and capital costs had very little impacts on the NPV compared to the other two parameters.

FIG. 23 shows sensitivity analysis results of the HCl leach only model and FIG. 24 sensitivity analysis of leach caustic crack model.

Economic Model Conclusions

To perform an economic analysis of the installation of different leach circuits time cash flow models were performed and NPV analysis was conducted. The first circuit was the HCl leach circuit found in by this research's results. The Leach only circuit had an estimated 85% rare earth recovery, and a higher estimated capital cost as the volume of leach vessels is relatively high compared to the caustic crack circuit. The second circuit analyzed was the historic HCl leach caustic crack circuit that had slightly lower capital costs as it was run at a much higher slurry density than the leach only circuit. This system had a higher operating cost due to the need of large amounts of NaOH, and had a lower recovery estimated to be 65%.

The cash flow models showed that the leach only circuit had a higher NPV, IRR, and a shorter payback period. Of the two systems the leach only circuit was much more profitable, though both are seen to add more value than the costs associated. A sensitivity analysis of the NPV's of each model was run to understand the parameters that most affected the value proposition. In both cases the interest rate, and rare earth recovery rate had the largest impact on NPV. This shows that the installation of the leach only circuit would be the most profitable as the higher recovery creates much more value over the caustic crack system.

CONCLUSIONS

A research program was performed to enhance the ability to extract rare earth elements from bastnaesite concentrates. Historically these elements have been produced through a variety processes including the Goldschmidt calcining process, the Molycorp roast-leach process, which involved into the Molycorp leach-crack process. Through this analysis a new leach process was shown to expand current capabilities and show that much higher recovery is possible.

Thermodynamic calculations were run to understand if the reactions of rare earth fluorocarbonate containing bastnaesite had the driving force to react with hydrochloric acid to produce an aqueous molecule. These calculations showed that both the reaction between the carbonate and fluoride structure had the thermodynamic driving force for the reaction to occur. The total reaction of the leach was then calculated and showed that the leach could be performed but was limited by the reactivity of rare earth fluoride. These calculations creating the processing route that first consumes the carbonate structure in hydrochloric leach then the fluoride structure followed with the excess acid.

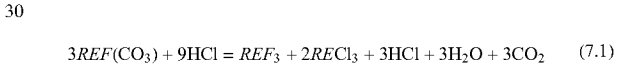

$$3REF(CO_3) + 9HCl = REF_3 + 2RECl_3 + 3HCl + 3H_2O + 3CO_2 \quad (7.1)$$

$$REF_3 + 3HCl = RECl_3 + 3HF$$

Using the thermodynamic models a testing program was developed to focus on how changing the kinetic parameters within the leach would affect the recovery of rare earths. This batch of testing provided results that showed a single stage leach with 15 gram per liter slurry density could recover up to 95% of the rare earths in solution. The results of the testing showed the parameters that had the largest impact on recovery were the HCl acid concentration and the temperature of the leach. The other parameters of particle size, time length of leach, and calcium carbonate concentration had little to no impact on the recovery of leach. Following this batch of testing fear that the low slurry density would not be industrially viable lead to a second experiment to test the impact of slurry density on rare earth recovery of the leach. This experiment showed that increasing the slurry density decreased the recovery of the leach, indicating that there is likely a maximum concentration of rare earths in solution. Though at a slurry density of 20 gram per liter solids there was still a rare earth recovery of around 85%. The results of the leaching testing showed how the low slurry density leach allows for all the rare earths in bastnaesite to be dissolved without forming rare earth fluoride. This production of rare earth fluoride seems to be the what keeps the leach from having recoveries above 70%.

Finally, an economic analysis was performed to compare the novel single stage leach system to the historic leach caustic crack system. This analysis showed that the implementation of both circuits would be value added profitable. Though the leach only circuit was more profitable as the NPV of the leach only circuit was 40% higher than the leach-crack circuit. A sensitivity analysis was also run to understand the parameters that affected the profitability of the projects the most. These parameters were the recovery of extraction circuit and the discount rate of the measurement. This then indicates that the most important part in profitability between the different processes is the ability to recover rare earths from the leach system.

Using the leach results as a basis and looking back at the historic thoughts on leach reaction there are major questions that need to be answered in order to really understand how bastnaesite reacts with hydrochloric acid. Specifically, under what conditions do the rare earth fluoride form? Is this a solubility limit of the rare earth, or a density of fluorine ions in the leach? The leach reaction that is then occurring in the low slurry density leach is shown below.

$$2REFCO_3 + 6HCl = 2RECl_3 + 2HF + 2CO_2 + 2H_2O \quad (7.2)$$

This reaction shows how complete reaction could occur in the leach conditions leading to the ability to have the shown recoveries up to 100%, all hinging on the rare earth fluoride form not being produced. In order to better understand the leach reaction and what is causing the higher recovery in the single stage low slurry density leach future work must be done to understand how the fluorine is interacting with the system. Some of this work has been done within this research but was limited to the free ions in the leach liquor after leaching. To understand fully how the leach is working the fluorine within the bastnaesite before the leach, and in what form the fluorine is in after the leach. This would have to expand to the dewatering step and the separation into individual rare earths to see if this single stage leach would be viable on an industrial scale.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, or 0.05% of a given value or range. Whenever the term "about" or "approximately" precedes the first numerical value in a series of two or more numerical values, it is understood that the term "about" or "approximately" applies to each one of the numerical values in that series.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of Illustration and description. They are not targeted to be exhaustive or to limit the examples to the precise forms disclosed. It will be apparent to one of ordinary skill in the art that many modifications and variations are possible in view of the above teachings.

What is claimed is:

1. A method of leaching at least one rare earth element from an ore material of an ore, the method comprising:
    (a) combining the ore material and an acid-containing liquid to form a solution, wherein the solution has a normality between about 1N and 5N, the solution has a solids concentration of greater than about 4 g/L and less than about 25 g/L, and the ore has not been roasted prior to forming the solution;
    (b) heating the solution up to between about 60 degrees Celsius and 100 degrees Celsius; and
    (c) allowing the at least one rare earth element in the ore material to dissolve and leach out of the ore to create a liquor comprising the at least one rare earth element.

2. The method of claim 1 wherein the at least one rare earth element is selected from cerium, lanthanum, praseodymium and neodymium.

3. The method of claim 2, wherein the at least one rare earth element is cerium.

4. The method of claim 1, wherein the ore comprises at least one mineral selected from monazite, xenotime, allanite, cerite, euxenite, fergusonite, bastnaesite, and gadolinite.

5. The method of claim 4, wherein the mineral is bastnaesite.

6. The method of claim 1, wherein the acid-containing liquid comprises hydrochloric acid.

7. The method of claim 5, wherein the normality is between 3N and 5N.

8. The method of claim 1, wherein the solids concentration is between about 15 g/L and about 20 g/L.

9. The method of claim 8, wherein greater than about 80% of the at least one rare earth element in the ore is leached into the liquor.

10. The method of claim 9, wherein the solids concentration is about 15 g/L.

11. The method of claim 9, wherein the solids concentration is about 20 g/L.

12. The method of claim 1, wherein the ore material is ground, prior to step (a), to a size having a p80 of about 45 to 25 µm, and the solids concentration is between about 15 g/L and about 20 g/L.

13. The method of claim 12, wherein about 80% of the ground ore material passes 400 mesh.

14. The method of claim 1, wherein the solids concentration is between about 15 g/L and about 20 g/L, and further comprising a (d), after step (c), of separating the liquor from solids in the solution.

15. The method of claim 14, wherein greater than about 80% of the at least one rare earth element in the ore material is leached into the liquor.

16. The method of claim 1, further comprising a step (b'), after step (a), of agitating the solution.

17. The method of claim 1, wherein step (b) includes agitating the solution.

18. A method of leaching cerium from a bastnaesite containing ore material, the method comprising:
    (a) combining the ore material and a liquid comprising HCl at a ratio of about 15-20 g ore material per liter of liquid, to form a solution, wherein the solution has a normality between about 3N and 5N, the ore material has a p80 size between about 45 and 25 µm, and the ore material has not been roasted prior to forming the solution;
    (b) heating the solution up to at least 85 degrees Celsius;
    (c) agitating the solution;
    (d) allowing the cerium in the ore material to dissolve and leach out of the ore material to create a cerium liquor.

19. The method of leaching cerium of claim 18, further comprising separating the cerium liquor from solids in the solution.

20. The method of claim 19, wherein greater than about 80% of the cerium in the ore material leaches into the cerium liquor.

* * * * *